(12) United States Patent
Amarant et al.

(10) Patent No.: US 10,668,342 B2
(45) Date of Patent: Jun. 2, 2020

(54) GOLF CLUB CONFIGURATION DETECTION SYSTEM

(71) Applicant: Acushnet Company, Fairhaven, MA (US)

(72) Inventors: Leonidas Amarant, Middletown, RI (US); Felipe Marcelino, New Bedford, MA (US); William Souza, Fall River, MA (US); Charles Hightower, Hyde Park, MA (US); Idris Screen, Providence, RI (US)

(73) Assignee: ACUSHNET COMPANY, Fairhaven, MA (US)

( * ) Notice: Subject to any disclaimer, the term of this patent is extended or adjusted under 35 U.S.C. 154(b) by 0 days.

(21) Appl. No.: 15/975,553

(22) Filed: May 9, 2018

(65) Prior Publication Data

US 2019/0344138 A1 Nov. 14, 2019

(51) Int. Cl.
*A63B 53/02* (2015.01)
*A63B 53/04* (2015.01)
*A63B 53/06* (2015.01)
*A63B 60/42* (2015.01)
(Continued)

(52) U.S. Cl.
CPC .............. *A63B 60/42* (2015.10); *A63B 53/02* (2013.01); *A63B 53/06* (2013.01); *A63B 60/46* (2015.10); *A63B 2053/027* (2013.01); *A63B 2053/0441* (2013.01); *A63B 2102/32* (2015.10); *A63B 2220/80* (2013.01); *A63B 2225/54* (2013.01)

(58) Field of Classification Search
CPC ... A63B 60/42; A63B 60/46; A63B 2053/027; A63B 2053/0441; A63B 53/06; A63B 53/02; A63B 2220/80; A63B 2069/3605; A63B 2069/3632; A63B 2225/54; A63B 2102/32
See application file for complete search history.

(56) References Cited

U.S. PATENT DOCUMENTS

| | | | |
|---|---|---|---|
| 6,386,987 B1 * | 5/2002 | Lejeune, Jr. | A63B 53/04 473/219 |
| 8,801,537 B1 | 8/2014 | Seluga | |
| 9,155,943 B2 | 10/2015 | Seluga | |

(Continued)

OTHER PUBLICATIONS

Shao, B., Chen, Q., Liu, R. and Zheng, L. (2012), "Design of fully printable and configurable chipless RFID tag on flexible substrate," Mierow. Opt. Technol. Lett., 54: 226-230. doi: 10.1002/mop.26499.

(Continued)

*Primary Examiner* — John E Simms, Jr.

(57) ABSTRACT

Methods and systems for detecting configuration states of a golf club and adjustment systems of a golf club, such as a shaft connection system. A golf club configuration detection system captures configuration data from the adjustment system of the golf club by a configuration detection device, such as a camera, a barcode scanner, or an RFID scanner. The captured configuration data is compared to reference configuration data to determine a configuration state of the adjustment system. Swing data and ball-flight data are tracked for golf-ball strikes with the golf club in the detected configuration state. Recommendations for configuration states may be generated based on the tracked data.

20 Claims, 13 Drawing Sheets

(51) Int. Cl.
*A63B 60/46* (2015.01)
*A63B 102/32* (2015.01)

(56) References Cited

U.S. PATENT DOCUMENTS

| | | | |
|---|---|---|---|
| 9,403,059 B1* | 8/2016 | Johannesen | G06Q 30/0621 |
| 9,403,067 B2 | 8/2016 | Zimmerman et al. | |
| 2004/0229707 A1* | 11/2004 | Lin | A63B 53/0466 |
| | | | 473/238 |
| 2009/0062029 A1* | 3/2009 | Stites | A63B 53/00 |
| | | | 473/288 |
| 2009/0088276 A1* | 4/2009 | Solheim | A63B 24/0003 |
| | | | 473/409 |
| 2010/0317451 A1* | 12/2010 | Stites | A63B 53/04 |
| | | | 473/257 |
| 2012/0035003 A1* | 2/2012 | Moran | A63B 69/36 |
| | | | 473/407 |
| 2012/0196692 A1* | 8/2012 | Beck | A63B 53/00 |
| | | | 473/221 |
| 2013/0029790 A1 | 1/2013 | Clark | |
| 2013/0184095 A1* | 7/2013 | Rauchholz | A63B 69/36 |
| | | | 473/223 |
| 2013/0196784 A1* | 8/2013 | Clausen | A63B 53/02 |
| | | | 473/242 |
| 2014/0121035 A1* | 5/2014 | Nivanh | A63B 53/00 |
| | | | 473/309 |
| 2014/0187342 A1 | 7/2014 | Brady | |
| 2014/0315654 A1 | 10/2014 | Seluga | |
| 2014/0316542 A1* | 10/2014 | Beno | H04M 1/72522 |
| | | | 700/91 |
| 2015/0182815 A1 | 7/2015 | Boggs | |
| 2016/0166902 A1* | 6/2016 | Day | A63B 60/46 |
| | | | 473/223 |
| 2016/0296810 A1* | 10/2016 | Mandel | H04B 5/0062 |
| 2019/0344139 A1 | 11/2019 | Amarant | |

OTHER PUBLICATIONS

U.S. Appl. No. 15/975,593, Office Action dated Sep. 23, 2019, 9 pages.
Titleist Surefit Performance Guide, located online at: https://web.archive.org/web/20171112091447/https://www.titleist.com/fitting/golf-club-fitting/surefit, obtained on the Wayback Machine using date Nov. 12, 2017, copyright 2017, 10 pgs.

* cited by examiner

GOLF CLUB CONFIGURATION DETECTION SYSTEM

BACKGROUND

As the available types and adjustability of golf clubs have increased, configurations for such golf clubs have become increasingly complex. For instance, modern drivers, fairway metals, and hybrid clubs frequently have adjustable components, such as adjustable weights or hosel systems, that allow a golfer to more finely tune the golf club to best fit the golfer's own swing characteristics. With the increase in adjustable components, however, tracking and recording the particular state or configuration of the adjustable components has become more difficult. When a fitting specialist is attempting to determine a best fit for the golfer, the fitting specialist is required to determine and accurately record each configuration so that it can be correlated to the club's performance when swung by the golfer. Similarly, even for robotic club or ball testing, the configurations of the golf club being used must be accurately determined.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for the localization of an implanted marker through ultrasound technology along with additional combinations of other modalities.

In one aspect, the technology relates to a method for identifying a golf club configuration. The method includes capturing, with a configuration detection device, first configuration data of an adjustment system of a golf club head, wherein the adjustment system is in a first configuration state and the adjustment system includes at least one configurable component capable of being physically adjusted. The method further includes causing a comparison of the captured first configuration data to reference configuration data in a database, wherein the reference configuration data corresponds to multiple configuration states of the adjustment system. In addition the method includes, based on the comparison of the first configuration data, determining that the adjustment system is in the first configuration state. The method also includes: capturing, with the configuration detection device, second configuration data of the adjustment system of the golf club in a second configuration state; causing a comparison of the captured second configuration data to the reference configuration data; and, based on the comparison of the second configuration data, determining that the adjustment system is in the second configuration state.

In an example, the method includes: capturing additional data from a shaft of the golf club and from a golf club head of the golf club; causing a comparison of the additional data to the reference configuration data in the database; and, based on the comparison of the additional data to the reference configuration data, identifying the shaft and golf club head. In another example, the method includes: capturing third configuration data of the adjustment system in a third configuration state; causing a comparison of the third configuration data to the reference configuration data in the database; based on the comparison of the third configuration data, determining that the database does not include reference configuration data corresponding to the third configuration state; displaying an interface to receive manual entry of details about the third configuration state; receiving entry of the details about the third configuration state; correlating the third configuration state with the captured third configuration data; and storing the captured third configuration data as reference configuration data in the database.

In still another example, the method includes: capturing third configuration data of the adjustment system in a third configuration state; causing a comparison of the third configuration data to the reference configuration data in the database; based on the comparison of the third configuration data, determining that the database does not include reference configuration data corresponding to the third configuration state; displaying an interface to receive manual entry of details about the third configuration state; receiving entry of the details about the third configuration state; correlating the third configuration state with the captured third configuration data; and storing the captured third configuration data as reference configuration data in the database.

In yet another example, the captured first configuration data includes data from a capture of at least one of a one-dimensional barcode or a two-dimensional barcode. In still yet another example, the adjustment system is a shaft connection system that includes a golf club head operably attached to a shaft of the golf club by a shaft connection system, wherein the shaft connection system includes an alignment reference indicator and a first configurable component having a first physical segment corresponding to the first configuration of the shaft connection system and a second physical segment corresponding to the second configuration of the shaft connection system. Further, the first physical segment includes: a first unique identifier that is at least one of an optical code identifier or a radio-frequency identification identifier, wherein a first scannable configuration identifier is formed when the first physical segment is aligned with the alignment reference indicator; and the second physical segment includes a second unique identifier that is at least one of an optical code identifier or a radio-frequency identification identifier, wherein a second scannable configuration identifier is formed when the second physical segment is aligned with the alignment reference indicator. In still yet another example, the method includes: tracking ball flight of a golf ball struck by the golf club having the adjustment system in the first configuration; and storing ball flight data from the tracked ball flight in a database such that the ball flight data is correlated with the golf club having the adjustment system in the first configuration. In another example, the adjustment system is at least one of an adjustable weighting system, a shaft connection system, or an adjustable face angle system. In yet another example, the configuration device is at least one of a camera, a barcode scanner, or a radio-frequency identification (RFID) scanner.

In another aspect, the technology relates to a golf club configuration detection system. The system includes a first configuration detection device, wherein the first configuration detection device is configured to automatically detect configuration data for a golf club, and a golf club performance tracking device. The system also includes: at least one processor operatively connected to the golf club performance tracking device and the first configuration detection device; and a memory operatively connected to the at least one processor and storing instructions that, when executed by the at least one processor, cause the at least one processor to perform a method. The method performed by the at least one processor includes: receiving, from the first configuration detection device, first configuration data for a first adjustment system of a golf club head, wherein the first adjustment system is in a first configuration and the first adjustment system includes at least one configurable component capable of being physically adjusted; causing a comparison of the received first configuration data to reference configuration data in a database, wherein the reference configuration data corresponds to multiple configurations of a golf club; based on the comparison of the first configuration data, determining that the first adjustment system is in the first configuration; receiving golf club performance data from the golf club performance tracking device; and correlating the received golf club performance data with the first configuration of the first adjustment system.

In an example, the golf club performance tracking device is at least one of a ball flight tracking device or a golf club head tracking device. In another example, the first configuration tracking device is at least one of a camera, a barcode scanner, or a radio-frequency identification (RFID) scanner. In another example, the system also includes a second configuration tracking device, wherein the second configuration tracking device is at least one of a camera, a barcode scanner, or a radio-frequency identification (RFID) scanner. In another example, the method performed by the at least one processor further includes: receiving, from the second configuration tracking device, second configuration data for a second adjustment system of the golf club head, wherein the second adjustment system is in a second configuration and the second adjustment system includes at least one configurable component capable of being physically adjusted; causing a comparison of the received second configuration data to the reference configuration data in the database; based on the comparison of the second configuration data, determining that the second adjustment system is in the second configuration; and correlating the received golf club performance data with the second configuration of the golf club. In yet another example, the first configuration tracking device is a barcode scanner and the second configuration tracking device is an RFID scanner. In still yet another example, the first adjustment system is at least one of an adjustable weighting system, a shaft connection system, or an adjustable face angle system. In another example, the system includes a trigger operatively connected to the first configuration tracking device and configured to activate the first configuration tracking device. In yet another example, the first configuration tracking device is mounted adjacent to a hitting area.

In another aspect, the technology relates to a golf club configuration detection system. The system includes at least one processor and a memory operatively connected to the at least one processor and storing instructions that, when executed by the at least one processor, cause the at least one processor to perform a method. The method performed by the at least one processor includes: receiving, from a configuration detection device, first configuration data for an adjustment system of a golf club, wherein the adjustment system is in a first configuration state and the adjustment system includes at least one configurable component capable of being physically adjusted; causing a comparison of the received first configuration data to reference configuration data in a database, wherein the reference configuration data corresponds to multiple configurations of the golf club; based on the comparison of the first configuration data, determining that the adjustment system is in the first configuration state; receiving golf club performance data from a golf club performance tracking device; and correlating the received golf club performance data with the first configuration of the first adjustment system. In an example, the adjustment system is at least one of an adjustable weighting system, a shaft connection system, or an adjustable face angle system. In another example, the golf club performance tracking device is at least one of a ball flight tracking device or a golf club head tracking device.

In another aspect, the technology relates to a golf club. The golf club includes a shaft and a golf club head operably attached to the shaft by a shaft connection system. The shaft connection system includes an alignment reference indicator and a first configurable component having a first physical segment corresponding to a first configuration of the shaft connection system and a second physical segment corresponding to a second configuration of the shaft connection system. The first physical segment includes a first unique identifier, wherein a first scannable configuration identifier is formed when the first physical segment is aligned with the alignment reference indicator; and the second physical segment includes a second unique identifier, wherein a second scannable configuration identifier is formed when the second physical segment is aligned with the alignment reference indicator. In an example, the shaft connection system includes a second configurable component, wherein the second configurable component includes a third physical segment and fourth physical segment. The third physical segment includes a third unique identifier that is at least one of an optical code identifier or a radio-frequency identification (RFID) identifier; the fourth physical segment includes a fourth unique identifier that is at least one of an optical code identifier or a radio-frequency identification identifier; wherein a third scannable configuration identifier is formed when the third physical segment is aligned with the first physical segment and the alignment reference indicator; wherein a fourth scannable configuration identifier is formed when the third physical segment is aligned with the second physical segment and the alignment reference indicator; wherein a fifth scannable configuration identifier is formed when the fourth physical segment is aligned with the first physical segment and the alignment reference indicator; and wherein a sixth scannable configuration identifier is formed when the fourth physical segment is aligned with the second physical segment and the alignment reference indicator.

In another example, the first configurable component is a ring of the shaft connection system and the second configurable component is a sleeve of the shaft connection system. In yet another example, the first physical segment and the second physical segment are tangs. In still another example, the first unique identifier and the second unique identifier are attached to the golf club head via at least one of an adhesive or a shrink-wrap. In still yet another example, the first unique identifier and the second unique identifier are RFID identifiers. In another example, the first unique identifier is at least one of an optical code identifier or a radio-frequency identification (RFID) identifier.

In another aspect, the technology relates to a golf club that includes a shaft, a golf club head operably connected to the shaft, and an adjustment system connected at least in part to the golf club head. The adjustment system includes a fixed reference component of radio-frequency identification (RFID) circuitry, and a first configurable component. The first configurable component includes: a first physical segment including a first portion of the RFID circuitry, wherein the first portion of the RFID circuitry is made at least in part from a first material having a first inductive property; and a second physical segment including a second portion of the RFID circuitry, wherein the first portion of the RFID circuitry is made at least in part from a second material having a second inductive property. The RFID circuitry is configured to reflect a first RFID signal when the first physical segment is aligned with the fixed reference component and the adjustment system is configured to reflect a second RFID signal when the second physical segment is aligned with the fixed reference component.

In an example, the first configurable component is a ring of a shaft connection system. In another example, the adjustment system further includes a second configurable component of the shaft connection system. The second configurable component of the shaft connection system includes: a third physical segment including a third portion of the RFID circuitry, wherein the third portion of the RFID circuitry is made at least in part from a third material having a third inductive property; a fourth physical segment including a fourth portion of the RFID circuitry, wherein the fourth portion of the RFID circuitry is made at least in part from a fourth material having a fourth inductive property. The RFID circuitry is configured to: reflect a third RFID signal when the third physical segment is aligned with the first physical segment and the fixed reference component; reflect a fourth RFID signal when the third physical segment is aligned with the second physical segment and the fixed reference component; reflect a fifth RFID signal when the fourth physical segment is aligned with the first physical segment and the fixed reference component; and reflect a sixth RFID signal when the fourth physical segment is aligned with the second physical segment and the fixed reference component.

In yet another example, the first configurable component is a ring of a shaft connection system and the second configurable component is a sleeve of a shaft connection system. In still another example, the adjustment system is at least one of an adjustable weighting system, a shaft connection system, or an adjustable face angle system. In still yet another example, the first portion of the RFID circuitry and the fixed reference component of the RFID circuitry are electrically connected when the first portion of the RFID circuit and the fixed reference component of the RFID circuitry are aligned. In another example, the shaft includes a first unique identifier and the golf club head includes a second unique identifier, wherein the first unique identifier is one of a barcode or an RFID tag.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

As discussed above, testing golf clubs and fitting a player for a proper golf club has become substantially more complex. Not only is each golf club itself different, each golf club may also have interchangeable or adjustable shafts, configurable hosels, adjustable weights, and adjustable dials for changing lie angle, among other adjustment systems. The present technology provides for a detection system that is able to accurately detect the configurations of each of these adjustable systems as well as the separate components of the golf club, such as the shaft and golf club head. The technology integrates optical and other electromagnetic sensors, such as radio-frequency identification (RFID) sensors, to identify markings or other identifiers on the golf club and the configurable components of the golf club. The identified markings are then utilized to generate a configuration state for the golf club. In some examples, all that is required of a fitting specialist is to set the golf club in front of the sensor(s) of the present configuration system. Once the configurations for the golf club are detected by the system, swing data and ball-flight data for the golf club are tracked and recorded. That recorded swing and ball flight data is then correlated to the detected configuration and analyzed to generate recommendations for the best fit for the player.

Figure 1A:
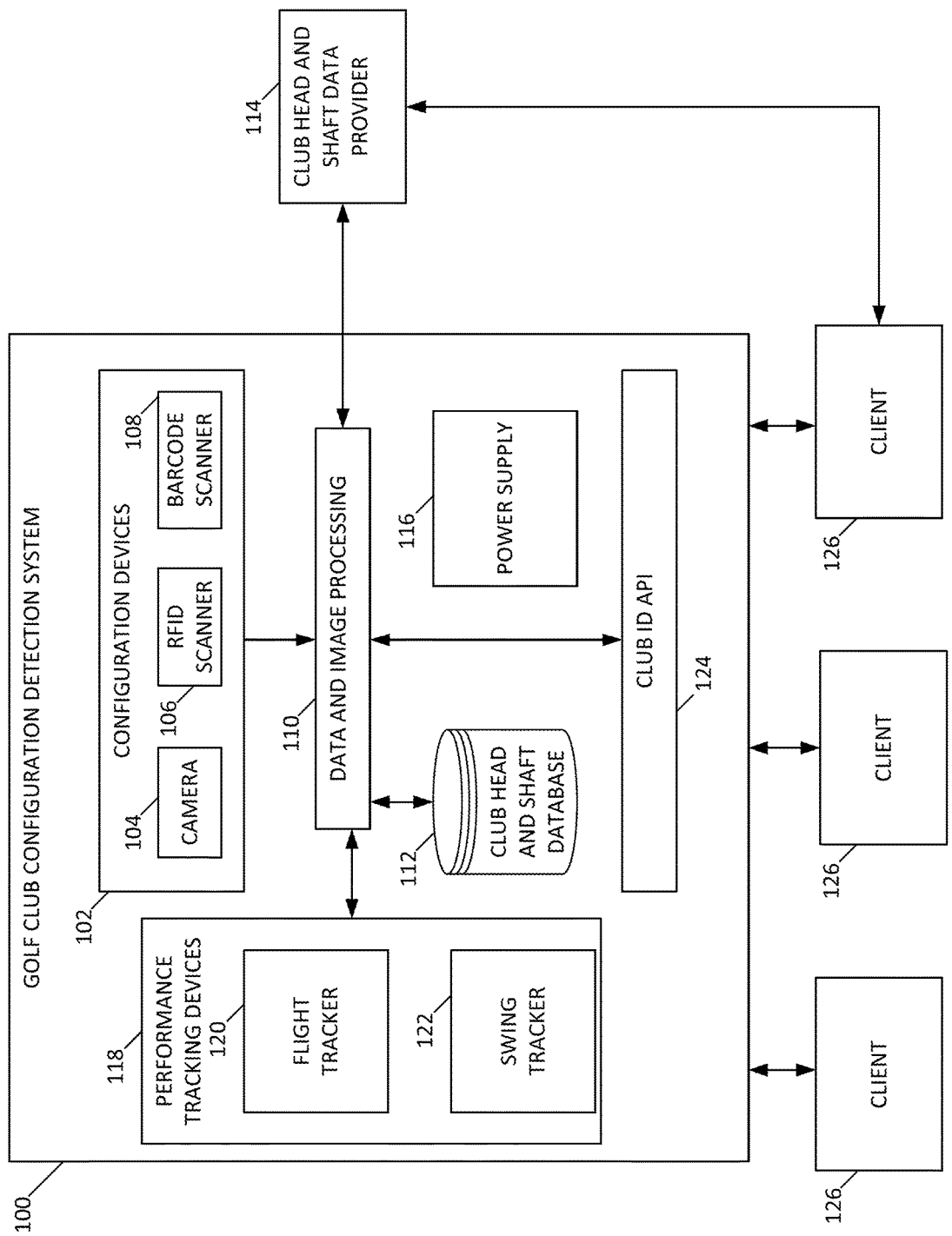
FIG. 1A depicts an example of a golf club configuration detection system.

FIG. 1A depicts an example of a golf club configuration detection system 100. The system 100 includes a plurality of configuration detection devices 102. The configuration detection devices 102 may include any devices that are used to capture configuration data by scanning a golf club or component thereof to detect a configuration state of a golf club. For example, the configuration detection devices 102 may include one or more of a camera 104, an RFID scanner 106, and a barcode scanner 108. The camera 104 may generally be a digital camera configured for capturing an image and converting the image into digital data capable of being processed to identify features within the image. In some examples, the camera 104 includes depth sensing technology to allow for detection of three-dimensional objects captured by the camera. In such an example, the camera 104 may include stereoscopic camera lenses. In other examples, the camera 104 may include an infrared projector for projecting an infrared pattern and an infrared camera for capturing the projected infrared pattern. The RFID scanner 106 may include a radio-frequency transceiver that is capable of emitting a signal to activate an RFID tag and receiving a signal from an RFID tag. The barcode scanner 108 generally includes a light source, a lens, and a light sensor for detecting light reflected from a barcode. The barcode scanner 108 may also include decoder circuitry to generate an output from the barcode scanner 108 that can be interpreted or processed to determine the data represented by a scanned barcode. In some examples, the functionality of the barcode scanner 108 may be integrated into the camera 104. In other examples, one or more of the configuration detection devices 102, such as the barcode scanner 108, may have a trigger for activating the respective detection device. Each of the configuration detection devices 102 generates an output signal representative of the data captured by the configuration detection devices 102.

The output signals from the configuration detection devices 102 are received by data and image processing components 110, which may include at least one processor and memory storing instructions for data and image processing. For instance, the data and image processing components 110 may receive unique identifiers (IDs) corresponding to scanned barcodes or RFID tags from the configuration detection devices 102. As an example, an RFID tag on the head of a golf club may be scanned by the configuration detection devices 102 and the corresponding unique ID is received by the data and image processing components 110.

Once the data and image processing components 110 receive a unique ID, that received unique ID is compared to data in a club head and shaft database 112, which may be stored either locally or remotely, such as a cloud-based database. The database 112 stores reference configuration data that includes data regarding unique IDs for club heads, shafts, adjustment systems, and/or configurable components. For example, the database 112 may store a table or matrix that correlates unique IDs with their corresponding club head, shaft, or configuration state of an adjustment system. Accordingly, the data and image processing components 110 may compare the unique ID received from the configuration detection devices 102 the reference data of the database 112 to determine configuration information about the club being scanned. For instance, the data and image processing components 110 may query the database 112 with the unique ID received from the configuration detection devices 102 and the result to the query is the corresponding club head, shaft, or configuration state of an adjustment system of the golf club.

In some instances, the database 112 may not include reference data for a unique ID received from the configuration detection devices 102. In such instances, the data and image processing components 110 may send a request or query to an external club head and shaft data provider 114. The data provider 114 may be a remote server or web service with access to additional reference data not available in the database 112. If the data provider 114 includes reference data for the unique ID, the reference data is received by the data and imaging processing components 110 to determine the corresponding club head, shaft, or configuration state. The received reference data from the data provider 114 may also be stored in the database 112. If the data provider 114 does not include the reference data for the unique ID, the system 100 may prompt for user input of the corresponding reference data. For instance, if the corresponding reference data cannot be found either remotely or locally for a unique ID, a prompt is displayed for a fitting specialist or other user to enter the club head, shaft, or configuration state corresponding to the unique ID. The received user input of reference data may then be stored in the database 112 and may also be sent to the data provider 114 for remote storage and/or synchronization of the reference data.

In other examples, the database 112 may be populated with reference data during an initialization process by a fitting specialist or other user. During the initialization process, a fitting specialist may enter, via a user interface presented by the system 100, configuration data corresponding to the different configuration identifiers on a golf club. For example, a fitting specialist may receive a kit of configuration identifiers to be attached to different components of a golf club, such as a golf club head, a shaft, and/or an adjustment system of the golf club. As the fitting specialist attaches a unique identifier to the component of the golf club, the fitting specialist may enter the unique ID of the configuration identifier and its corresponding configuration state into the database 112. In some examples, the new configuration identifier may be scanned by one or more of the configuration devices 102 during the initialization process. As the new configuration identifiers are scanned, prompts to enter the corresponding configuration state may be displayed. The configuration state details received in response to the prompt may then be stored in the database 112 as correlated with the scanned configuration identifier. The initialization process allowed different fitting specialists or users to create customized reference data sets for their own respective needs or club sets.

The reference data in the database 112 may also be accessible to other sources, such as clients 126, through a golf club ID application programming interface (API) 124. The API 124 allows for standardization of communications to and from the system 100 and may utilize protocol such as the Hypertext Transfer Protocol (HTTP) and/or Web Sockets among other network-based communications protocols. The API 124 may also be used in communicating with the club head and shaft data provider 114. The determined configuration state of the golf club being scanned may also be provided to external sources via the API 124. Performance data and statistics that are recorded or tracked by the performance tracking devices 118 may also be provided to external sources and/or clients 126 via the API 124.

The data and image processing components 110 may also identify different configurations of the golf club through image analysis techniques as well. For example, some physical segments of an adjustable system may be labeled with optical code identifiers, such as letter markers (e.g., A, B, C, D, etc.) and/or number markers (e.g., 1, 2, 3, 4, etc.) to allow for detection of different configurations. Those optical code identifiers may be identified in an image of the adjustment system. Once the optical code identifiers are identified through image analysis, the configuration state of the adjustment system may be determined. Other optical code identifiers other than numbers or letters may also be used, such as dot or line patterns. In other examples, the configurable component may have a different two-dimensional or three-dimensional shape for each of its configuration states. In such examples, the image analysis techniques may be used to identify those shapes. The image analysis techniques may also be based on machine learning techniques, such as neural networks, deep learning algorithms, statistical analysis techniques, enhanced contrast techniques, blob analysis, optical character recognition, or other pattern recognition or matching techniques that are trained based on the shape of the adjustment system or the optical code identifiers of the adjustment system. For instance, a plurality of images may be captured for each configuration state of an adjustment system. Those images may then be used as a training set of for a machine learning image analysis algorithm. The image data received from the configuration detection devices 102 may subsequently be provided as an input into the trained image analysis algorithm to determine a current configuration state of the adjustment system being analyzed. The output from the trained image analysis algorithm may be configured to directly provide details of the configuration state of the adjustment system or a unique ID that can be compared against data in a database, such as club head and shaft database 112.

The golf club configuration detection system 100 may also include performance tracking devices 118, such as a ball flight tracker 120 and a swing tracker 122. The performance tracking devices 118 track the performance of a ball strike from a golf club in a detected configuration state. In an example, once the configuration of the golf club is detected, each ball strike may be tracked by the performance tracking devices 118. For instance, the ball flight tracker 120 tracks the flight characteristics of a golf ball struck by the golf club in the detected configuration state. The flight characteristics may include ball speed, trajectory, spin, carry, roll, total distance, and other ball flight characteristics. The swing tracker 122 tracks swing characteristics of the golf club, such as swing path, face angle, club head speed, loft, and other swing characteristics. In some example, swing tracker 122 and the ball flight tracker 120 may be provided in the same device. The tracked performance characteristics are then stored as corresponding the configuration state of the golf club to allow for a determination of best configuration state of the golf club for a particular player. As an example, the player or fitter may place the club in proximity or in front of one or more of the configuration detection devices 102 to detect the configuration state of golf club. Subsequently, the performance of all golf shots with the golf club in the detected configuration are tracked by the performance tracking devices 118 and correlated with the detected configuration state. The process may repeat upon a new configuration state of the golf club, such as when the player or fitting specialist changes the configuration of the golf club.

Each of the components of the golf club configuration detection system 100 may be housed or attached to a single housing, and in some examples, that single housing may be portable, such a cart or handheld device. In some examples, the performance tracking devices 118 may be physically separated, but remain connected via a wired or wireless interface, from the remainder of the components of the system 100. The system 100 may also include a power supply 116 to supply power to the components of the system 100. In some examples, the power supply 116 includes a battery and in some examples the power supply 116 may include a power cord for plugging into a traditional power outlet.

Components of the system 100 may also be integrated into portions of a driving range or practice facility. For example, one or more of the configuration detection devices 102 may be integrated into a practice golf mat or directly into the ground of the driving range. As an example, an RFID scanner 106 may be integrated into a practice golf mat and tapping the section of the mat with the golf club triggers the RFID scanner 106 to read any RFID tags on the golf club. Optical scanners, such as a camera 104 or a barcode scanner 108 may also be integrated into practice mat, which allows for a golf club to be passed over the camera 104 or barcode scanner 108 to capture optical data (e.g., barcodes or images) of the golf club. The configuration detection devices 102 may also be wirelessly connected to the remainder of the system 100. The performance tracking devices 118 may also be wirelessly connected to the remainder of the system. The performance tracking devices 118 may also be mounted adjacent a hitting area, such as a golf mat or a segment of a driving range.

Figure 1B:
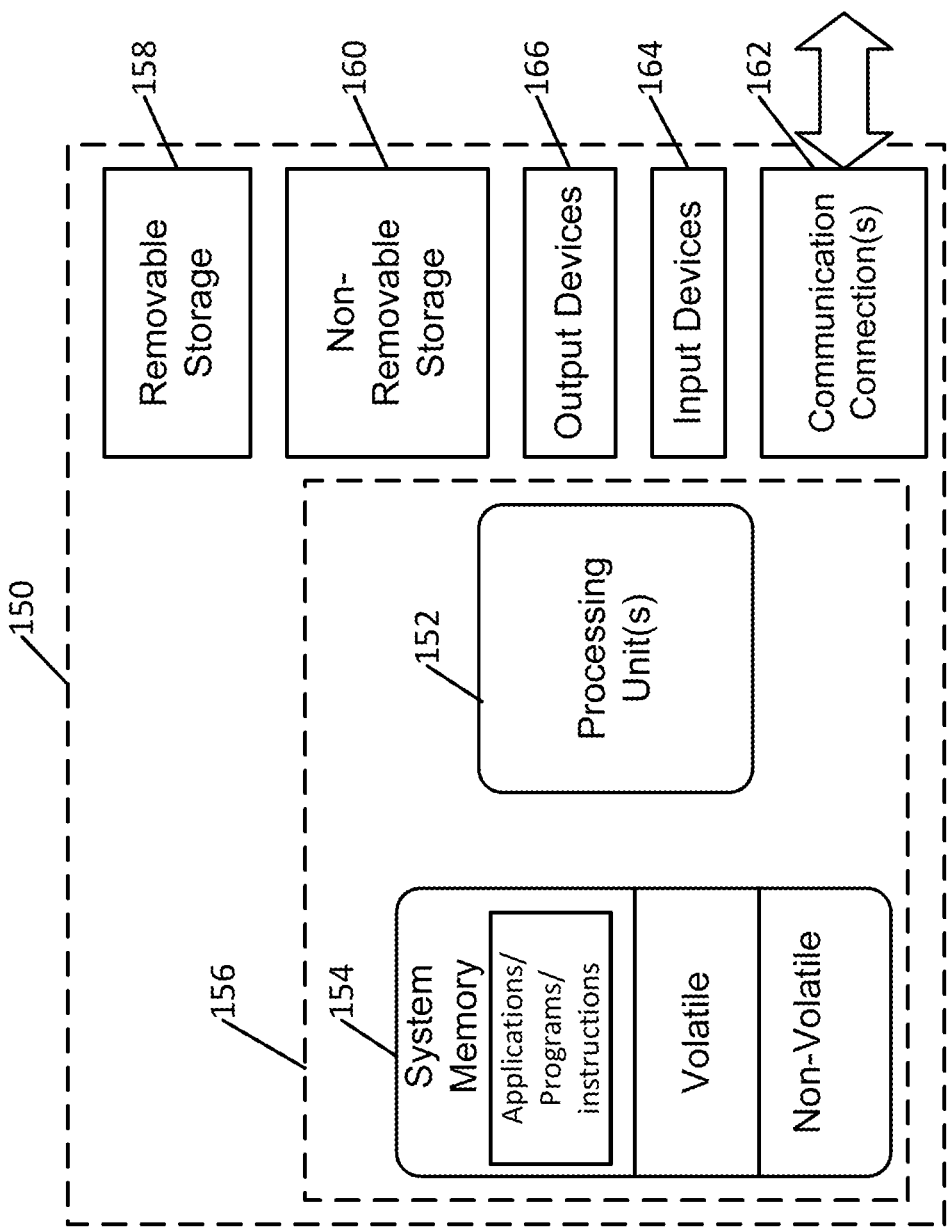
FIG. 1B depicts an example of a suitable operating environment for incorporation into the golf club configuration detection system of FIG. 1A.

FIG. 1B depicts an example of a suitable operating environment 150 for incorporation into the golf club configuration detection system 100. For example, the operating environment may be suitable for incorporation and use with the data and image processing components 110 of the system 100. In its most basic configuration, operating environment 150 typically includes at least one processing unit 152 and memory 154. Depending on the exact configuration and type of computing device, memory 154 (storing instructions to perform the active monitoring embodiments disclosed herein) may be volatile (such as RAM), non-volatile (such as ROM, flash memory, etc.), or some combination of the two. This most basic configuration is illustrated in FIG. 1E by dashed line 156. Further, environment 150 may also include storage devices (removable 158, and/or non-removable 160) including, but not limited to, solid-state storage, magnetic or optical disks or tape. Similarly, environment 150 may also have input device(s) 164 such as keyboard, mouse, pen, voice input, etc. and/or output device(s) 166 such as a display, speakers, printer, etc. The input devices 164 may also include one or more antennas to detect signals emitted from the various configuration detection devices 102 and/or the performance tracking devices 118. Also included in the environment may be one or more communication connections 162, such as LAN, WAN, point to point, WIFI, BLUETOOTH, TCP/IP, etc. In embodiments, the connections may be operable to facilitate point-to-point communications, connection-oriented communications, connectionless communications, etc.

Operating environment 150 typically includes at least some form of computer readable media. Computer readable media can be any available media that can be accessed by processing unit 152 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 150 may be a single computer operating in a networked environment using logical connections to one or more remote computers, such as clients 126 and/or data provider 114. The remote computer may be a personal computer, a server, a router, a network PC, a peer device or other common network node, and typically includes many or all of the elements described above as well as others not so mentioned. The logical connections may include any method supported by available communications media.

Figure 2A:
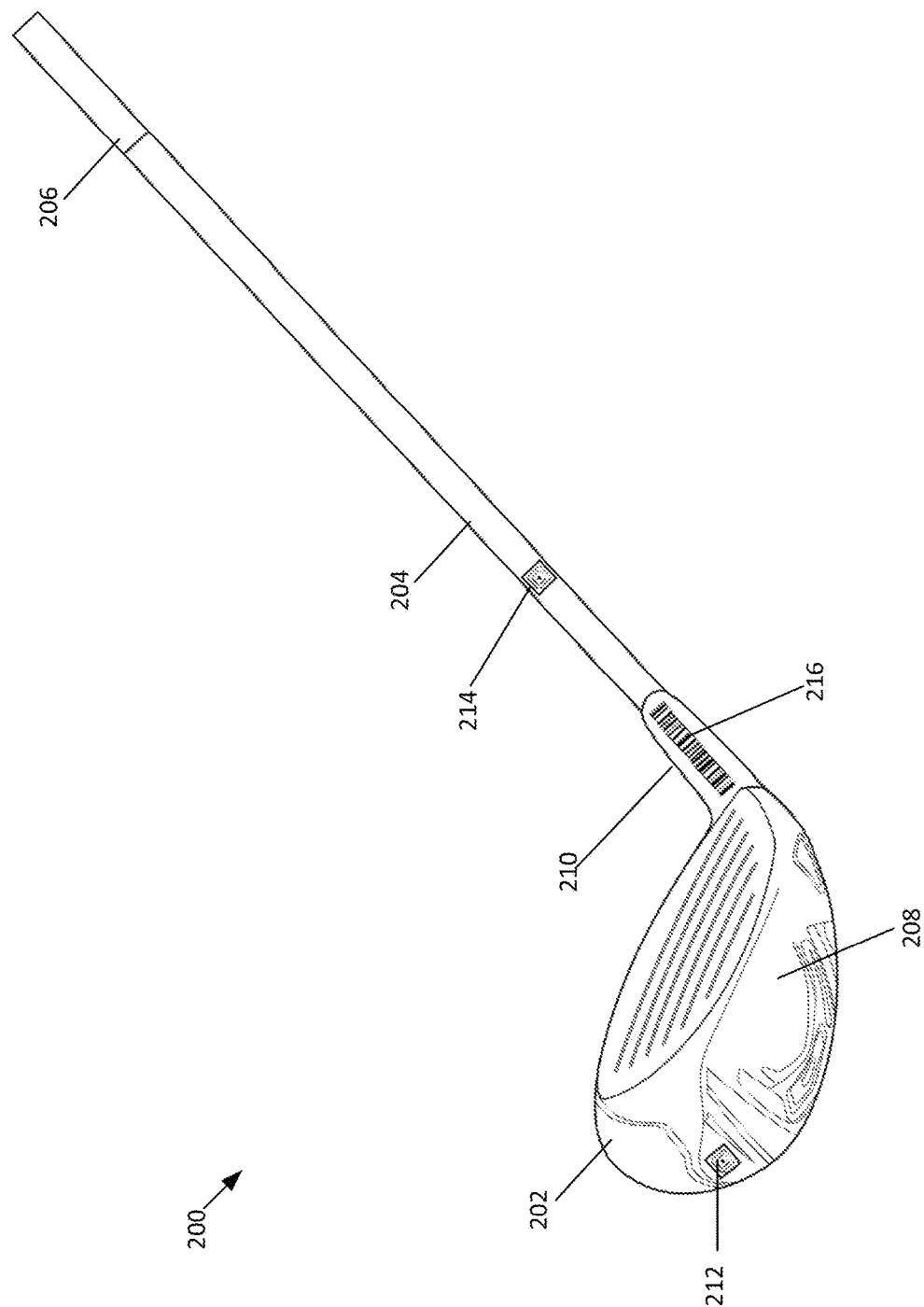
FIG. 2A depicts an example golf club having configuration identifiers.

FIG. 2A depicts an example golf club 200 having multiple configuration identifiers. The golf club 200 includes a golf club head 202 attached to a shaft 204 via a hosel 210 of a shaft connection system. The shaft 204 also includes a grip 206 and the bottom of the golf club head 202 is referred to as the sole 208. The golf club head 202 includes a club head identifier 212 and the shaft 204 includes a shaft identifier 214. The club head identifier 212 may be an optical code identifier, such as a barcode or image, or an RFID identifier, such as a passive RFID tag. The barcode may be a one-dimensional barcode or a two-dimensional barcode, such as a QR code. The passive RFID tag may be an inlay tag that is attached to the club head 202. In other examples, the RFID tag may be hard tag integrated into the club head. For instance, the RFID tag may be embedded within the golf club head. The shaft identifier 214 may similarly be an optical code identifier or an RFID tag. The grip 206 may also include a grip identifier (not shown) in situations where the golf club 200 has interchangeable grips. The hosel 210 also has a configurable hosel identifier 216. The configurable hosel identifier 216 may also be an optical code identifier or an RFID tag. The configurable hosel identifier 216 is discussed in further detail below with reference to FIGS. 2B-2F. In some examples, the golf club 200 may also include additional adjustment systems in addition to the adjustable hosel 210, such as an adjustable weighting system on the sole 208 and/or an adjustable face angle system on the sole 208. In such examples, the additional adjustment systems may each include a configuration identifier.

The configuration identifiers, such as the club head identifier 212, the shaft identifier 214, and the hosel identifier 216 may be attached to the golf club 200 via an adhesive or a shrink wrap. For example, the identifiers for the golf club 200 may be provided as a set or kit for attaching to the golf club 200 or a set of golf clubs (or golf club components). For instance, a kit having the club head identifier 212, the shaft identifier 214, and the hosel identifier 216 may be provided in a single package to attach to the golf club 200 after manufacturing of the golf club. In such an example, the club head identifier 212 and the shaft identifier 214 may be provided as RFID inlays with an adhesive backing, such as a sticker. The hosel identifier 216 may be provided as a shrink-wrap piece. The hosel identifier 216 may then be placed over the hosel 210 and heated to shrink the hosel identifier 216 onto the hosel 210. The identifier kit may also include configuration identifiers for a plurality of golf club heads and shafts, as well as any adjustable systems included on those respective golf club heads and shafts. For example, a particular golf club head may be available in left-handed version and a right-handed version, each with ten different loft angles (e.g., 8.0 degrees through 12.5 degrees). In that example, the kit may include twenty club head identifiers where each identifier has a unique ID corresponding to each club head (e.g., right-hand vs. left-hand and loft). A configuration identifier for each adjustment system on each golf club head may also be provided in the kit. The kit may also include a configuration identifier for each different shaft that is desired to be in a testing or fitting set. In other examples, some or all of the configuration identifiers may be printed or manufactured directly on the golf club 200.

Figure 2B:
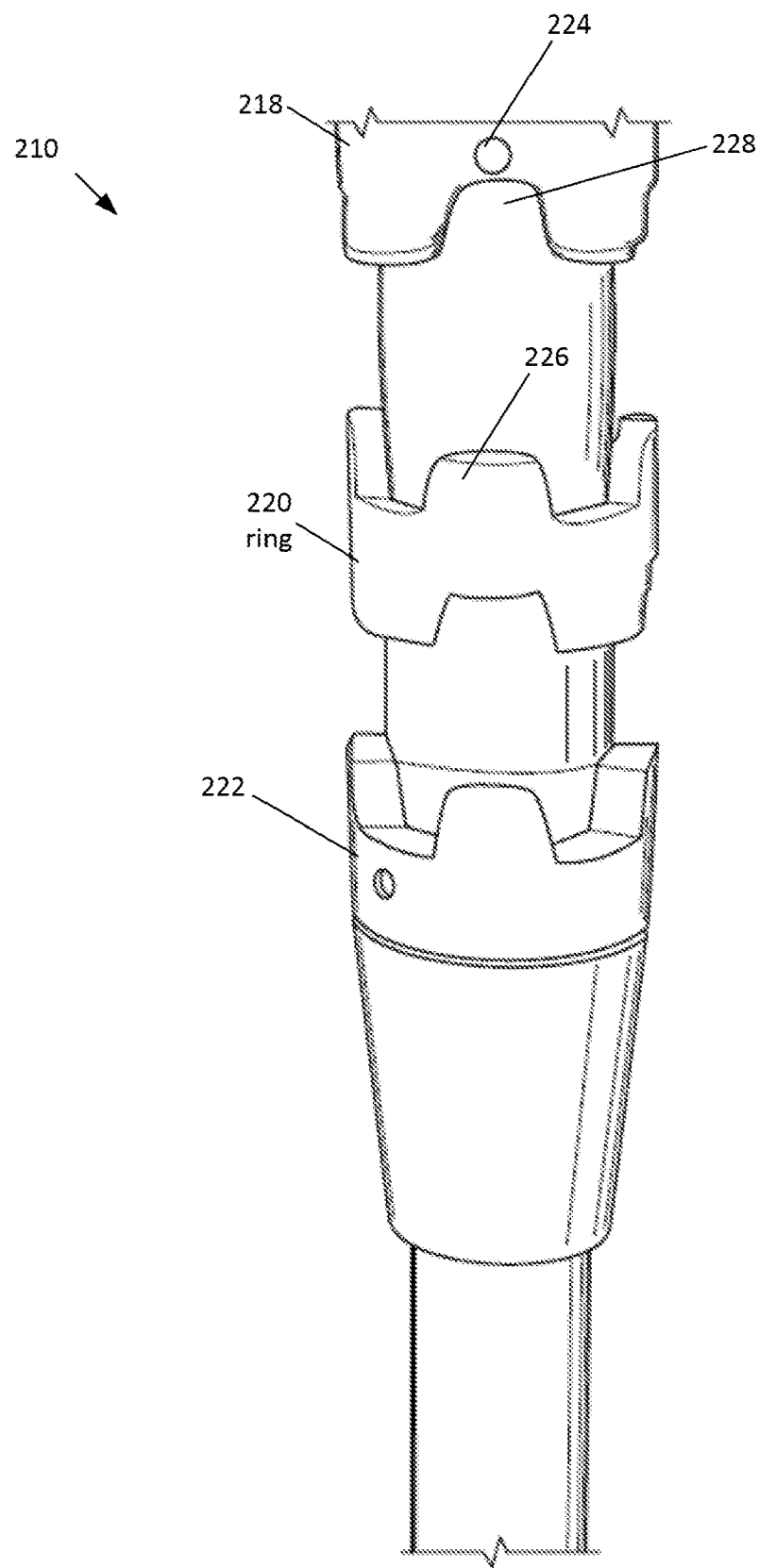
FIG. 2B depicts an example of a configurable hosel component.

FIG. 2B depicts an example of a configurable hosel 210 in an expanded position. The configurable hosel 210 may be a part of a shaft connection system and is one example of an adjustment system. The example configurable hosel 210 depicted in FIG. 2B is similar to the SUREFIT® hosel system from the Acushnet Company of Fairhaven, Mass. The configurable hosel 210 includes a fixed portion 218 attached to the club head 202 and two configurable components: a rotatable ring 220 and a rotatable sleeve 222. The fixed portion 228, the rotatable ring 220, and the rotatable sleeve 222 each include a series of tangs 226 and notches 228. When the configurable hosel 210 is tightened together, the tangs 226 fit into the notches 228 (see, e.g., FIGS. 2D-2E). By rotating the ring 220 and the sleeve 222, multiple different configuration states for the configurable hosel 210 may be achieved. In the example depicted, the ring 220 includes four different settings, with each setting including a different tang 226 on the ring 220. The sleeve 222 similarly has four different settings, with each setting including a different tang 226 on the sleeve 222. The configuration state of the configurable hosel 210 corresponds to the settings of the ring 220 and the sleeve 222 that are aligned with an alignment reference indicator 224. Additional details regarding a similar configurable hosel system may be found in U.S. Pat. No. 9,403,067, titled "Interchangeable Shaft System," which is incorporated herein by reference in its entirety.

Figure 2C:
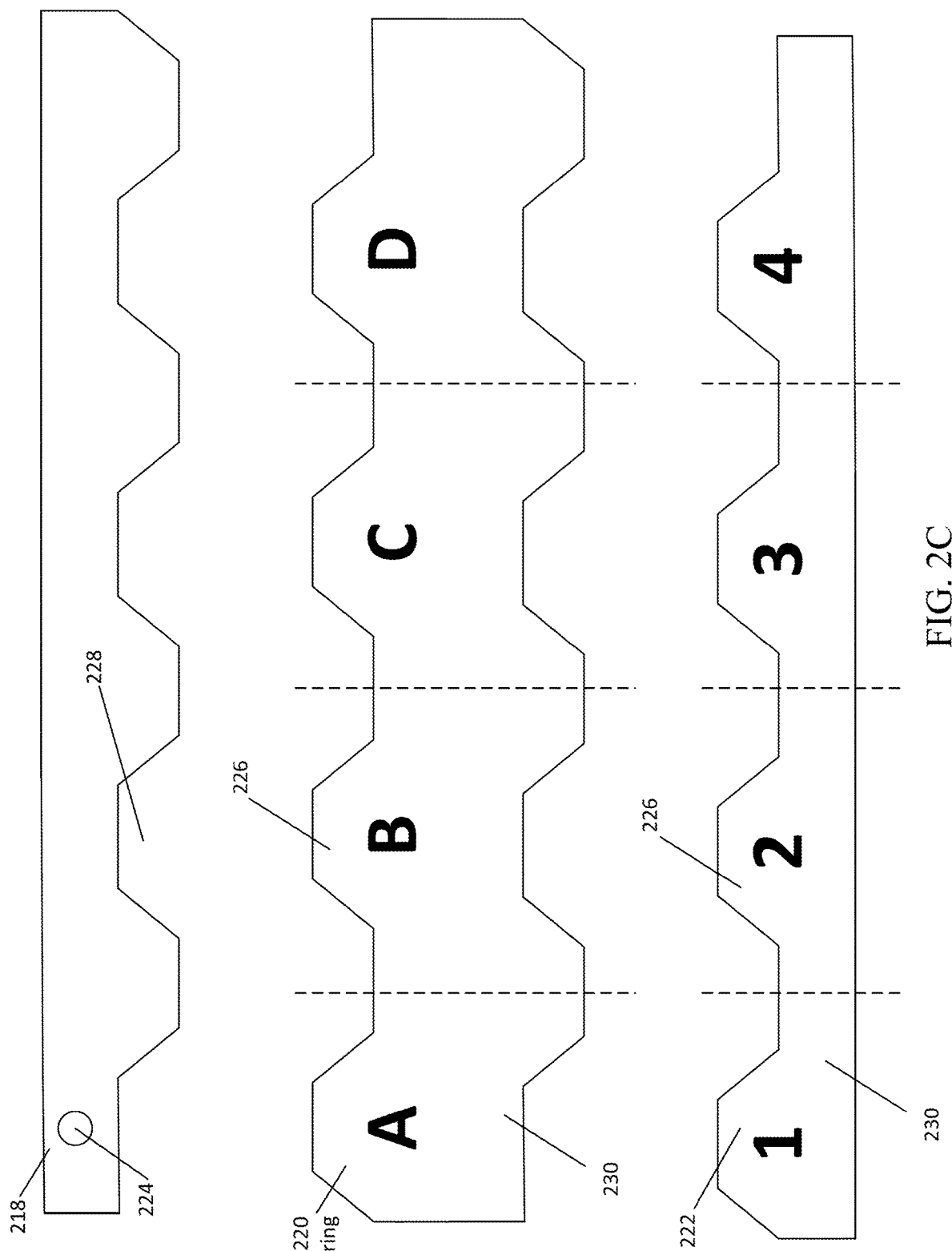
FIG. 2C depicts an example projection of the configurable hosel component of FIG. 2B.

FIG. 2C depicts an example projection of the configurable hosel 210 of FIG. 2B. FIG. 2C depicts an example of the configurable hosel 210 in an "unrolled" form so that each segment of the configurable hosel 210 may be seen. The ring 220 has four segments that correspond to different settings, and the sleeve 222 also has four segments that correspond to different settings. More specifically, the ring 220 has a first physical segment marked with an "A," a second physical segment marked with a "B," a third physical segment marked with a "C," and a fourth physical segment marked with a "D." The sleeve 222 has a first physical segment marked with an "1," a second physical segment marked with a "2," a third physical segment marked with a "3," and a fourth physical segment marked with a "4." Each of the physical segments may be marked with its respective optical code identifier (e.g., its respective letter or number indicator). For example, the "A" segment may have an "A" printed or engraved on the physical segment.

In the example where the ring 220 and the sleeve 222 each have four different settings or segments, sixteen different combinations of configuration states are possible by rotating the ring 220 and the sleeve 222 to different positions. For instance, when the "A" segment of the ring 220 is aligned with the "1" segment of the sleeve 222 and the alignment reference indicator 224, the configurable hosel 210 is in a first configuration state, which may be referred to as the "A1" configuration state. In some examples, the A1 configuration state corresponds to a standard loft and lie setting for the golf club 200. As different segments of the ring 220 and the sleeve 222 are aligned with one another, the loft and lie of the golf club 200 may be adjusted. For instance, where the "C" segment is aligned with the "4" segment and the alignment reference indicator 224, the golf club is in another configuration state (e.g., the "C4" configuration state). The C4 configuration state may correspond to the golf club having a 0.75 degree increase in loft and the lie being 0.75 degrees flat. The boundaries between segments have been identified with dashed lines in FIG. 2C. While the boundaries have been indicated as approximately at a middle point between the respective segments, the boundaries may be located at different positions in other examples.

Figure 2D:
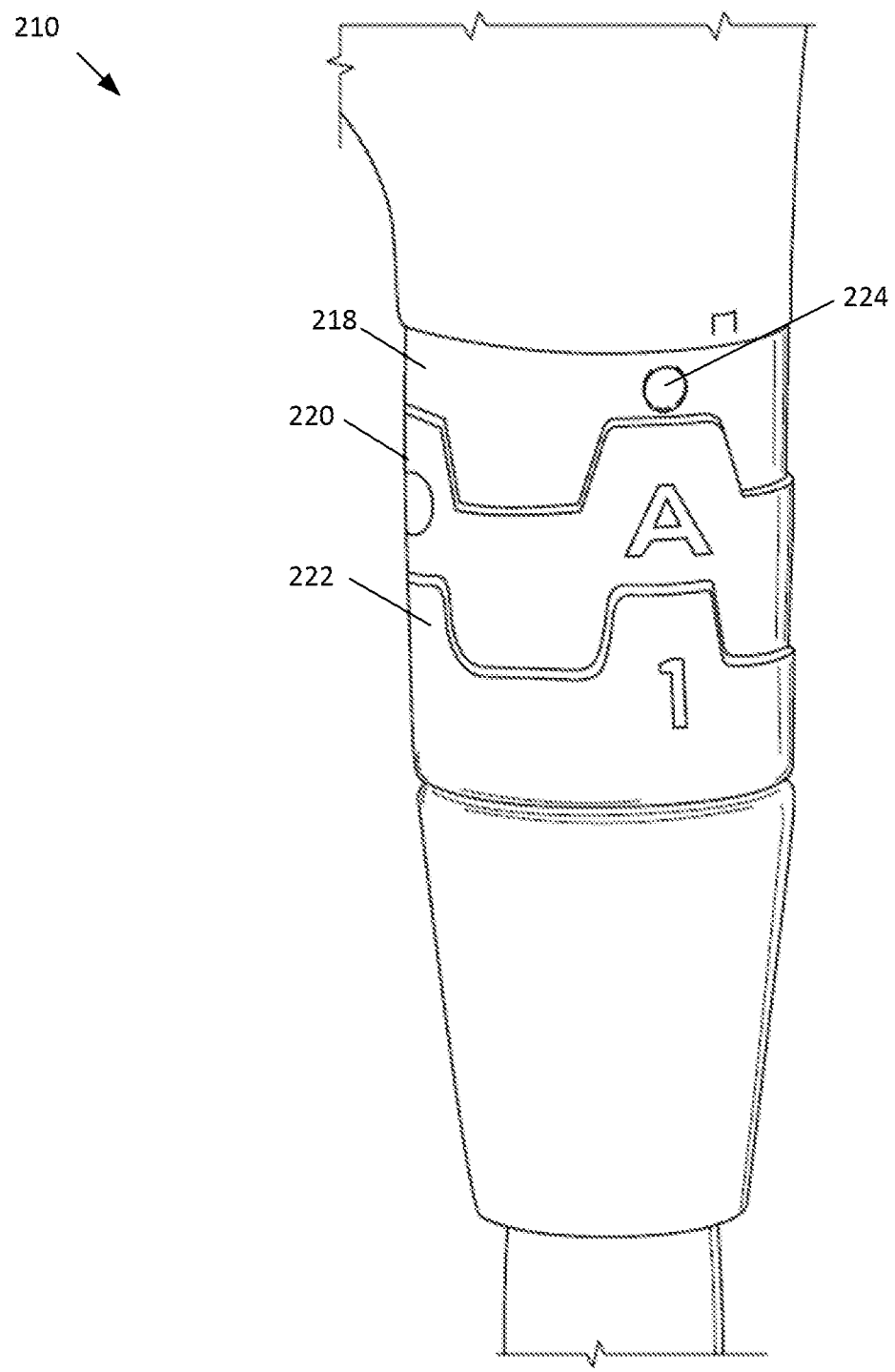
FIG. 2D depicts an example configuration of the configurable hosel component of FIG. 2B.

FIG. 2D depicts the configurable hosel 210 in its tightened position. The configurable hosel is in the A1 configuration state. That is, the alignment reference indicator 224 of the fixed portion 218 is aligned with the "A" physical segment of the rotatable ring 220 and the "1" physical segment of the rotatable sleeve 222. The A1 configuration state of the configurable hosel 210 may be detected by scanning the configurable hosel 210 with one of the configuration detection devices 102, such as the camera 104. For instance, an image of the configurable hosel 210 may be captured by the camera 104. That captured image is analyzed using the image analysis techniques described above to identify the alignment reference indicator 224, the "A" marking, and the "1" marking. The aligned combination of the alignment reference indicator 224, the "A" marking, and the "1" marking form a unique scannable configuration identifier for the A1 configuration state of the configurable hosel 210. That particular unique scannable configuration identifier may be referred to as the A1 unique identifier. Once the A1 unique identifier is identified through the image analysis techniques, the A1 unique identifier may be compared to a database of unique identifiers to determine that the A1 unique identifier corresponds to the A1 configuration state (e.g., standard loft and lie setting).

While not depicted, a golfer or fitting specialist may adjust the configurable hosel 210 to a new configuration state, such as the C4 configuration state. When the configurable hosel is in the C4 configuration state, the alignment reference indicator 224, a "C" marking on the ring 220, and a "4" marking on the sleeve 222 are aligned, forming another unique scannable configuration identifier. That unique scannable configuration identifier may be referred to as the C4 unique identifier. Similar to the identification of the A1 unique identifier, the C4 unique identifier may be identified or detected by analyzing an image of the configurable hosel 210 captured by a configuration detection device such as camera 104. Once the C4 unique identifier is identified, the C4 unique identifier may be compared to a database of unique identifiers to determine that the C4 unique identifier corresponds to the C4 configuration state (e.g., 0.75 degree increase in loft and a 0.75 degree flat lie). Each of the different sixteen configuration states for the example configurable hosel 210 has its own unique scannable configuration identifier that may be identified and processed similar to the A1 and C4 unique identifiers discussed above.

Figure 2E:
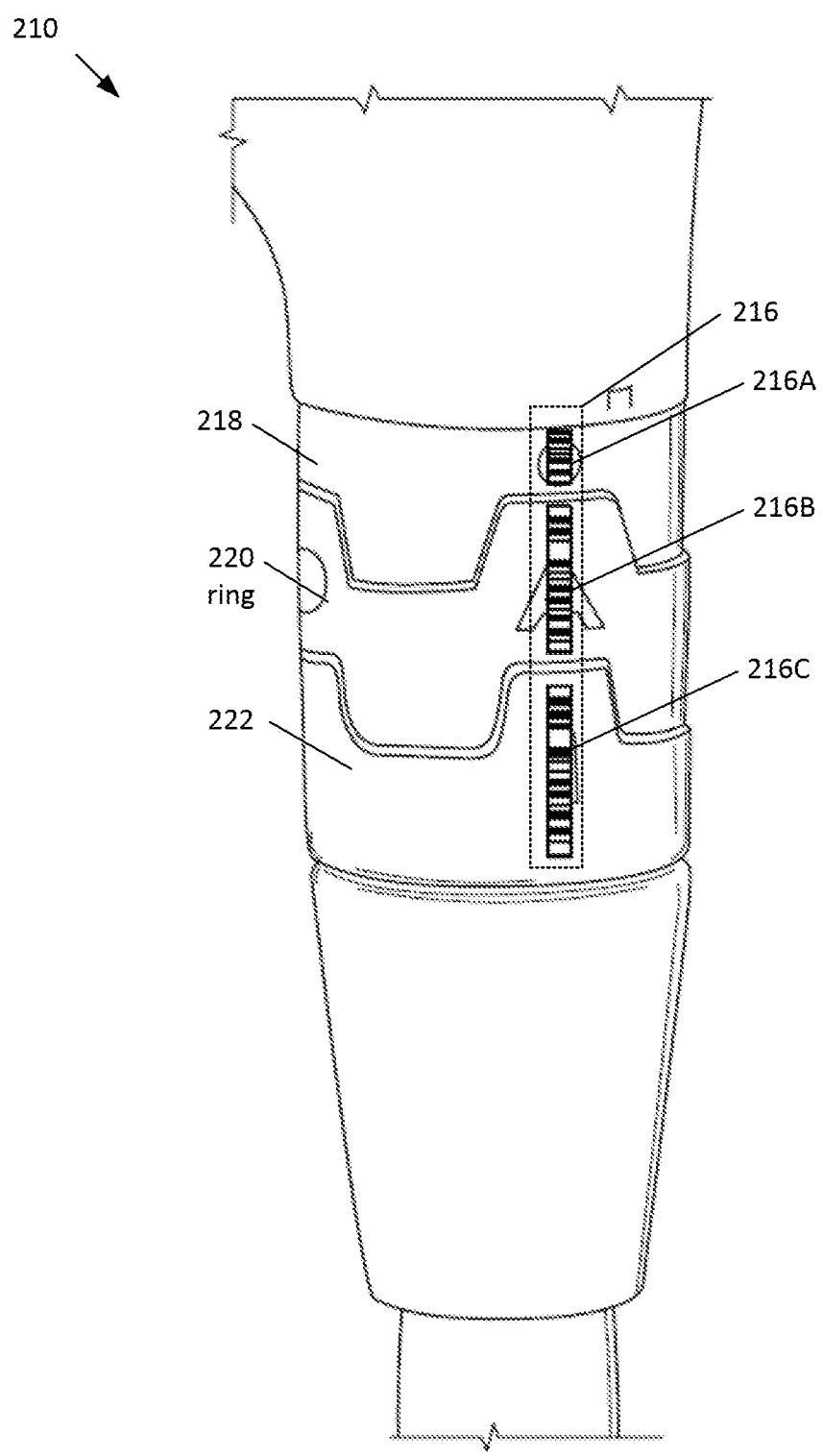
FIG. 2E example configuration of the configurable hosel component of FIG. 2B using barcodes.

FIG. 2E depicts another example of the configurable hosel 210 in its tightened position. In the example depicted in FIG. 2E, the alignment reference indicator 224 and each segment of the ring 220 and the sleeve 222 include an optical code identifier in the form of a barcode segment of a barcode scannable configuration identifier 216. More specifically, the alignment reference indicator 224 is replaced or covered by the barcode segment 216A, the "A" marker is replaced or covered by the barcode segment 216B, and the "1" marker is replaced or covered by the barcode segment 216C. The segments of barcodes may be attached subsequent to manufacturing and thus may be placed over the number and lettering markers shown in FIG. 2D. For example, each barcode segment may be provided as part of kit and adhesively attached to the configurable hosel 210, as discussed above.

Similar to the number and letter markings discussed above, the aligned combination of the alignment barcode segment 216A, the barcode segment 216B, and the barcode segment 216C form a unique scannable configuration identifier corresponding to the A1 configuration state for the configurable hosel 210. Although only one segment of the ring 220 and sleeve 222 are shown as having a barcode, each segment of the ring 220 may have its own unique segment of a barcode and each segment of the sleeve 222 may also have its own unique segment of barcode. Accordingly, when a segment of the ring 220 and a segment of the sleeve 222 are aligned with one another and the alignment barcode segment 216A, a unique scannable configuration identifier is formed as a unique barcode 216 corresponding to the particular configuration state. Thus, the configuration state of the configurable hosel 210 may be detected by scanning the configurable hosel 210 with a configuration detection device 102, such as the barcode scanner 108. Errors or misreads of the barcode scanner 108 are lessened through the use of the alignment barcode segment 216A. For instance, only scans that include the alignment barcode segment 216A are considered valid scans. Scans not including the alignment barcode segment 216A may cause an error to be displayed or signaled, requiring a rescan of the configurable hosel 210. Once the unique barcode identifier 216 has been detected, the detected barcode identifier may be compared to unique identifiers in a database to determine the configuration state of the configurable hosel 210.

Figure 2F:
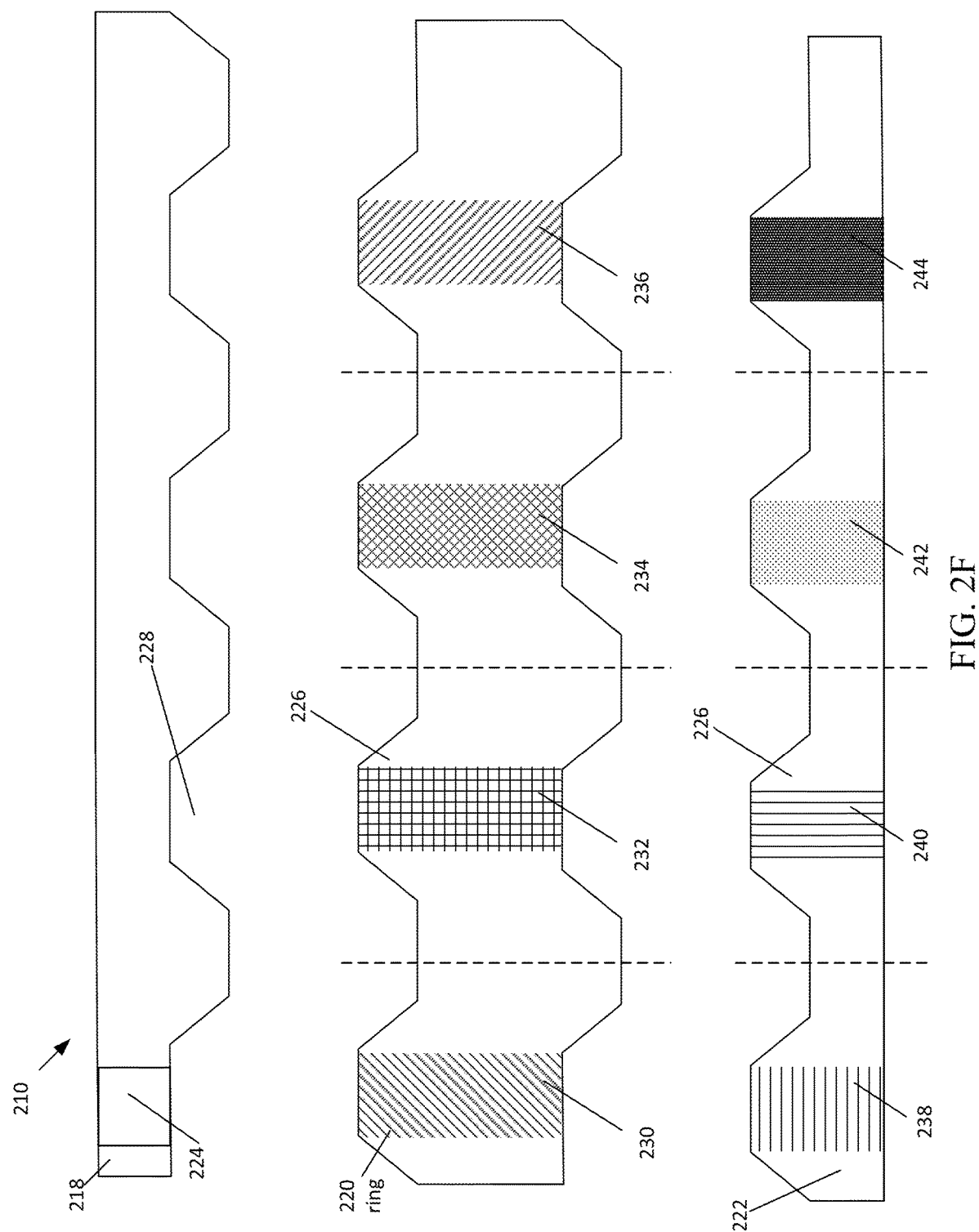
FIG. 2F depicts another example configuration of the configurable hosel component of FIG. 2B using different materials.

FIG. 2F depicts a projection of another example of the configurable hosel 210 of FIG. 2B. The example configurable hosel 210 creates a unique RFID tag for each of the sixteen possible configuration states of the configurable hosel 210. Each segment of the ring 220 has a different inductive properties and each segment of the sleeve has different inductive properties. For example, in the ring 220, the first ring segment may include a first unique portion of an RFID circuit 230, the second ring segment may include a second unique portion of an RFID circuit 232, the third ring segment may include a third unique portion of an RFID circuit 234, and the fourth ring segment may include a fourth unique portion of an RFID circuit 236. Similarly, the sleeve 222 may include the first sleeve segment may include a fifth unique portion of an RFID circuit 238, the second sleeve segment may include a sixth unique portion of an RFID circuit 240, the third sleeve segment may include a seventh unique portion of an RFID circuit 242, and the fourth sleeve segment may include a fourth unique portion of an RFID circuit 244. The alignment reference indicator 224 includes a fixed reference component of the RFID circuit.

Each unique portion of the RFID circuit displays different inductive properties. For instance, each unique portion of the RFID circuit may be made from a different material, a different thickness of a material, or have other different circuit characteristics that result in the unique portions of the RFID circuit having different inductive properties. Due to the differing inductive properties of each portion of the RFID circuit, the configurable hosel will reflect a different RFID signal in response to an RFID transmission from an RFID scanner depending on the unique configuration state of the configurable hosel 210. For example, where the first ring segment is aligned with the first sleeve segment and the alignment reference indicator 224 (e.g., the A1 configuration state), the configurable hosel 210 reflects a unique RFID signal. When the third ring segment is aligned with the fourth sleeve segment and the alignment reference indicator 224 (e.g., the C4 configuration state), the configurable hosel 210 reflects a different unique RFID signal.

The respective portions of the RFID circuit may be conductively connected to one another when aligned. As an example, when the first ring segment and the first sleeve segment are aligned with one another, the first portion of the RFID circuit 230 and the fourth portion of the RFID circuit 238 may be in electrical or conductive contact with one another. For instance, the first portion of the RFID circuit 230 may have one or more electrical contacts configured to engage one or more electrical contacts of the fourth portion of the RFID circuit 238. Each portion of the RFID circuit of the ring 220 and the sleeve 222 may have similar electrical contacts. Further, the portions of the RFID circuit on the ring 220 may have one or more electrical contacts to engage one or more electrical contacts of the fixed reference component of the RFID circuit in the alignment reference indicator 224. Accordingly, when the configurable hosel 210 is in the tightened position, an RFID circuit (e.g, a resonant or LC circuit) is formed between the fixed component of the RFID circuit, the aligned portion of the RFID circuit from the ring 220, and the aligned portion of the RFID circuit from the sleeve. In other examples, the portions of the RFID circuit need not be conductively connected to one another and may still operate as a unique RFID circuit based on the inductive properties of the portions of the RFID circuit. One example of a suitable solution for generating the portions of the RFID circuitry and the fixed component of the RFID circuitry is described in Shao, B., Chen, Q., Liu, R. and Zheng, L. (2012), "Design of fully printable and configurable chipless RFID tag on flexible substrate," Microw. Opt. Technol. Lett., 54: 226-230. doi:10.1002/mop.26499, which is incorporated herein by reference in its entirety.

While the above discussion in FIGS. 2A-2F have focused primarily on a configurable hosel, the concepts and technology discussed therein are applicable to other types of adjustable systems, such as an adjustable weighting system, an adjustable face angle system, and/or other shaft connection systems, shaft length adjustment systems, and/or grip weight adjustment systems, among other potential adjustment systems of a golf club. As an example, an adjustable weighting system may be a system similar to the SURE-FIT® adjustable weighting system available from the Acushnet Company of Fairhaven, Mass. In such an example, different weights may have portions of an RFID circuit, similar to the portions of the RFID circuit discussed above with reference to FIG. 2F. Each end of each weight may also include different unique portions of an RFID circuit to assist in identifying orientation of the weight when inserted into the weight port. The weight end cap may then have a fixed component of the RFID circuit such that a unique RFID circuit is formed between the weight and the weight end cap when the weight is inserted into the golf club head. In other adjustable weighting systems, each different weight may include an RFID tag, a barcode (or a segment thereof), or another visual indicator (such as a letter or a number) detectable by one of the configuration detection devices 102. In general, the identifiers or markers may be incorporated into any adjustable system of a golf club head that has adjustable physical segments. For instance, unique markers or portions of markers may be incorporated onto each of the physical segments to allow for detection of the relative position of one physical segment to another physical segment.

Figure 3A:
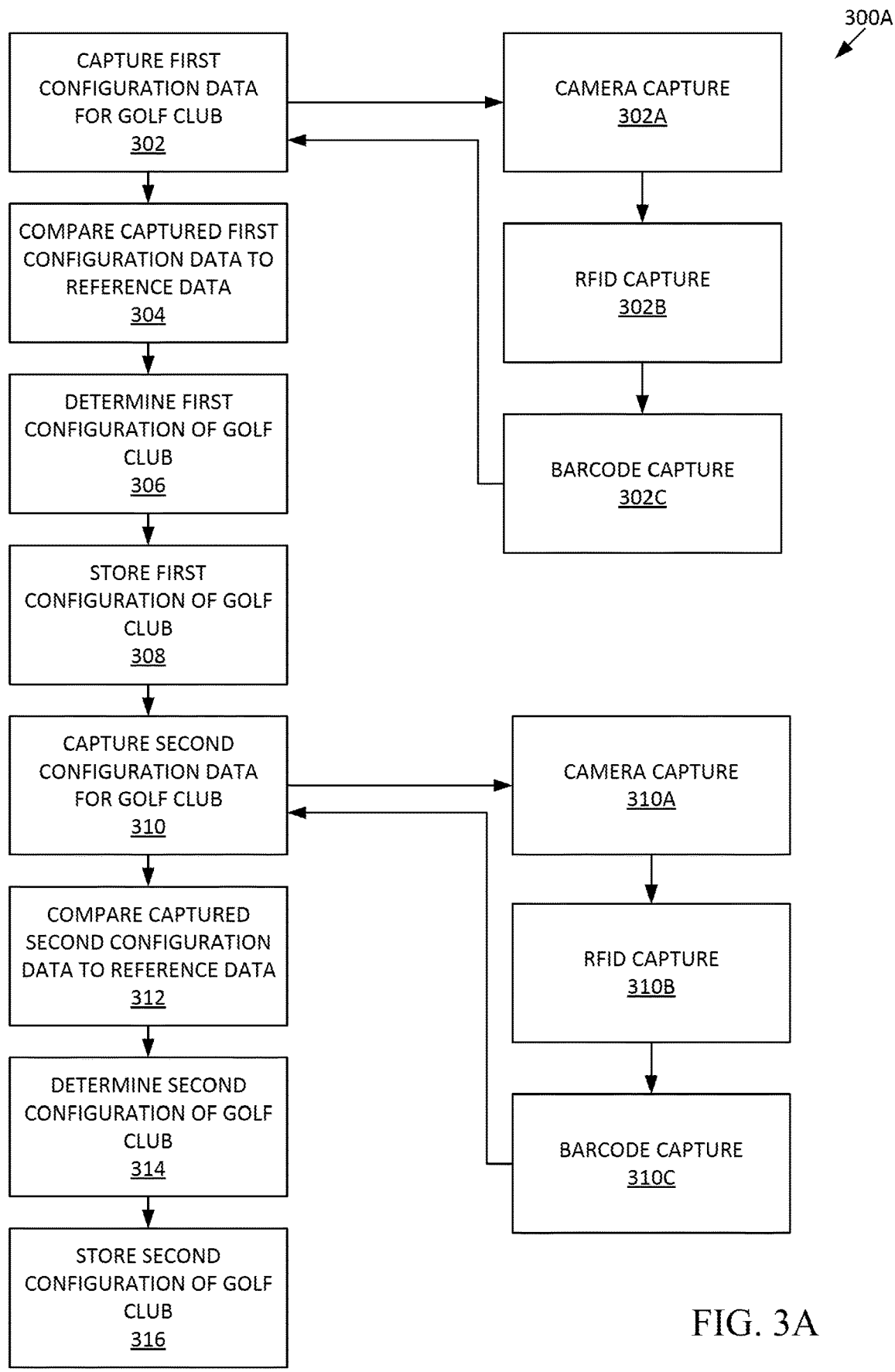
FIG. 3A depicts an example method for detecting a golf club configuration.

FIG. 3A depicts an example method 300A for detecting a golf club configuration. Each of the operations discussed in method 300A and the methods discussed herein may be performed by the golf club configuration detection system 100 (depicted in FIG. 1A) or a portion thereof, including at least one processor coupled to memory. At operation 302, first configuration data of an adjustment system of a golf club head is captured. The first configuration data is captured when the adjustment system is in a first configuration state. The first configuration data may correspond to data that is captured by one or more of the configuration detection devices. For example, a camera may capture an image of the adjustment system at operation 302A, an RFID scanner may capture data from an RFID tag or circuit of the adjustment system in operation 302B, and/or a barcode scanner may capture barcode data from the adjustment system in operation 302C. Although operations 302A, 302B, and 302C are depicted as serial operations, the capture may involve only one or fewer than all of those operations depending on the method of capture being employed. The first configuration data may include a unique ID generated from an image (such as a detection of letters, numbers, and an alignment reference indicator), a unique ID from an RFID tag, and/or a unique ID from a barcode scan.

At operation 304, the captured first configuration data is compared to reference configuration data stored in a database, such as the club head and shaft database 112 depicted in FIG. 1. The reference configuration data includes multiple unique ID corresponding the configuration states of the adjustment system. The comparison of the captured first configuration data to the reference configuration data may be accomplished by querying the database with the captured first configuration data, such as a captured unique ID. Based on the comparison in operation 304, the first configuration state of the adjustment system is determined at operation 306. For example, where the adjustment system is a configurable hosel, the configurable hosel may be determined to be in the A1 configuration state (e.g., standard loft and lie setting). The determination may include receiving a result to the query of the database in operation 304. Once the first configuration state of the adjustment system has been determined, the first configuration state may be stored at operation 308. Storing the detected first configuration state allows for later analysis of the performance of the golf club in the first configuration state as compared to other configuration states.

At operation 310, second configuration data is captured for the adjustment system when it is in a second configuration state. Operations 310-316 are similar to operations 302-308 except the adjustment system is in a different configuration state. For example, during a fitting or testing of a golf club, the adjustment system may be altered to test a new setting or configuration state of the adjustment system. That new configuration setting or configuration state may be detected in a similar fashion as the first configuration state is detected. For instance, capturing the second configuration data may include an image capture from a camera in operation 310A, an RFID signal capture in operation 310B, and/or a barcode capture in operation 310C. Although operations 310A, 310B, and 310C are depicted as serial operations, the capture may involve only one or fewer than all of those operations depending on the method of capture being employed. The captured second configuration data is then compared to the reference configuration data at operation 312. Based on the comparison in operation 312, the second configuration state of the adjustment system of the golf club may be determined at operation 314. The determined second configuration state of the adjustment system of the golf club may then be stored in operation 316. The method 300A may continue for multiple additional configuration states of the adjustment system. For example, as the adjustment system is altered into additional configuration states, such as third configuration state and a fourth configuration state, those respective configuration states may be detected based on the operations in method 300A. Additional configuration data for the golf club head or a shaft may also be captured in method 300A. For instance, an image, RFID tag, or a barcode of a shaft or a club head of the golf club may be captured. The type of shaft or club head may be determined by performing similar operations as included in method 300A.

Figure 3B:
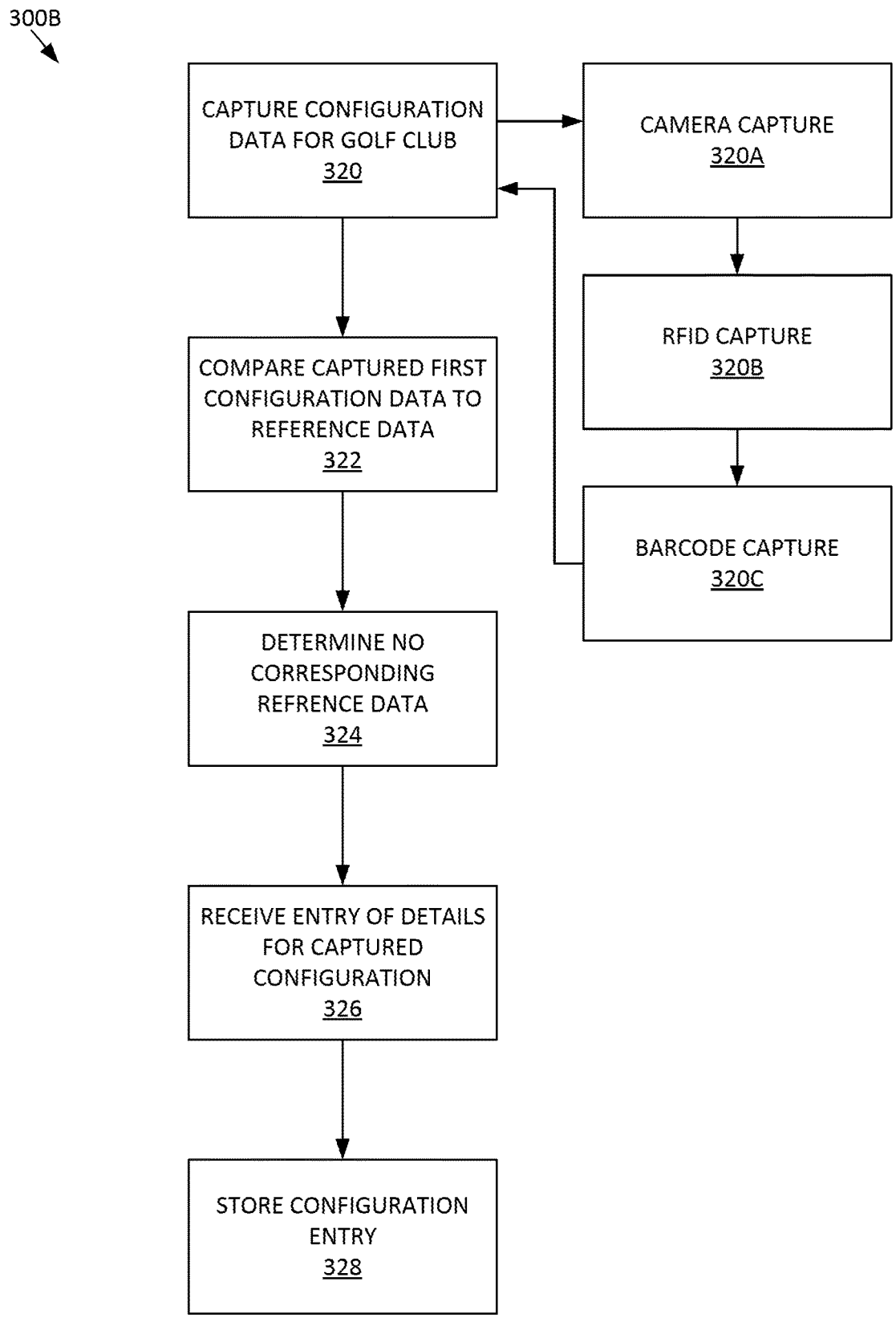
FIG. 3B depicts another example method for detecting a golf club configuration.

FIG. 3B depicts another example method 300B for detecting a golf club configuration. At operation 320, configuration data for a golf club component, such as a golf club head, a shaft, or an adjustable system is captured. The first configuration data may correspond to data that is captured by one or more of the configuration detection devices. For example, a camera may capture an image of at least a portion of the golf club at operation 320A, an RFID scanner may capture data from an RFID tag or circuit of the golf club in operation 320B, and/or a barcode scanner may capture barcode data from the golf club in operation 320C. Although operations 320A, 320B, and 320C are depicted as serial operations, the capture may involve only one or fewer than all of those operations depending on the method of capture being employed. The first configuration data may include a unique ID generated from an image (such as a detection of letters, numbers, and an alignment reference indicator), a unique ID from an RFID tag, and/or a unique ID from a barcode scan.

At operation 322, the captured configuration data is compared to reference configuration data stored in a database, such as the club head and shaft database 112 depicted in FIG. 1. The comparison of the captured configuration data to the reference configuration data may be accomplished by querying the database with the captured configuration data, such as a captured unique ID. Based on the comparison in operation 322, a determination that there is no corresponding reference data for the captured configuration data is made at operation 324. The determination in operation 324 may include receiving a null result or error in response to the query of the database in operation 322. Based on the determination that the reference data is missing an entry for the captured configuration data, an interface or prompt may be displayed for input of details of the captured configuration data.

The details for the configuration state corresponding to the captured configuration data are received at operation 326. Those details may be received as manual entry into a displayed user interface. As an example, where the captured configuration data indicates that a configurable hosel is in the C4 configuration state, but there is no corresponding entry in the reference configuration data, a user may manually enter that the C4 configuration state corresponds to the golf club having a 0.75 degree increase in loft and the lie being 0.75 degrees flat. The details for the configuration state received in operation 326 are then correlated with the captured configuration data and stored as reference configuration data in operation 328. For instance, the captured configuration data and the received details may be stored as entries in a database such that a subsequent query for the captured configuration data returns a result of the details received in operation 326. The manual entry of the configuration state corresponding to configuration data may also occur during an initial setup or initialization process of the golf club configuration detection system. In such examples, operation 324 of the method 300B may be omitted during the initialization process. As an example, configuration data may be captured for a new configuration identifier by scanning the new configuration identifier with one or more of the configuration devices 102 during the initialization process. As the new configuration identifiers are scanned, prompts to enter the corresponding configuration state may be displayed. The configuration state details received in response to the prompt may then be stored in the database 112 as correlated with the scanned configuration data.

Figure 3C:
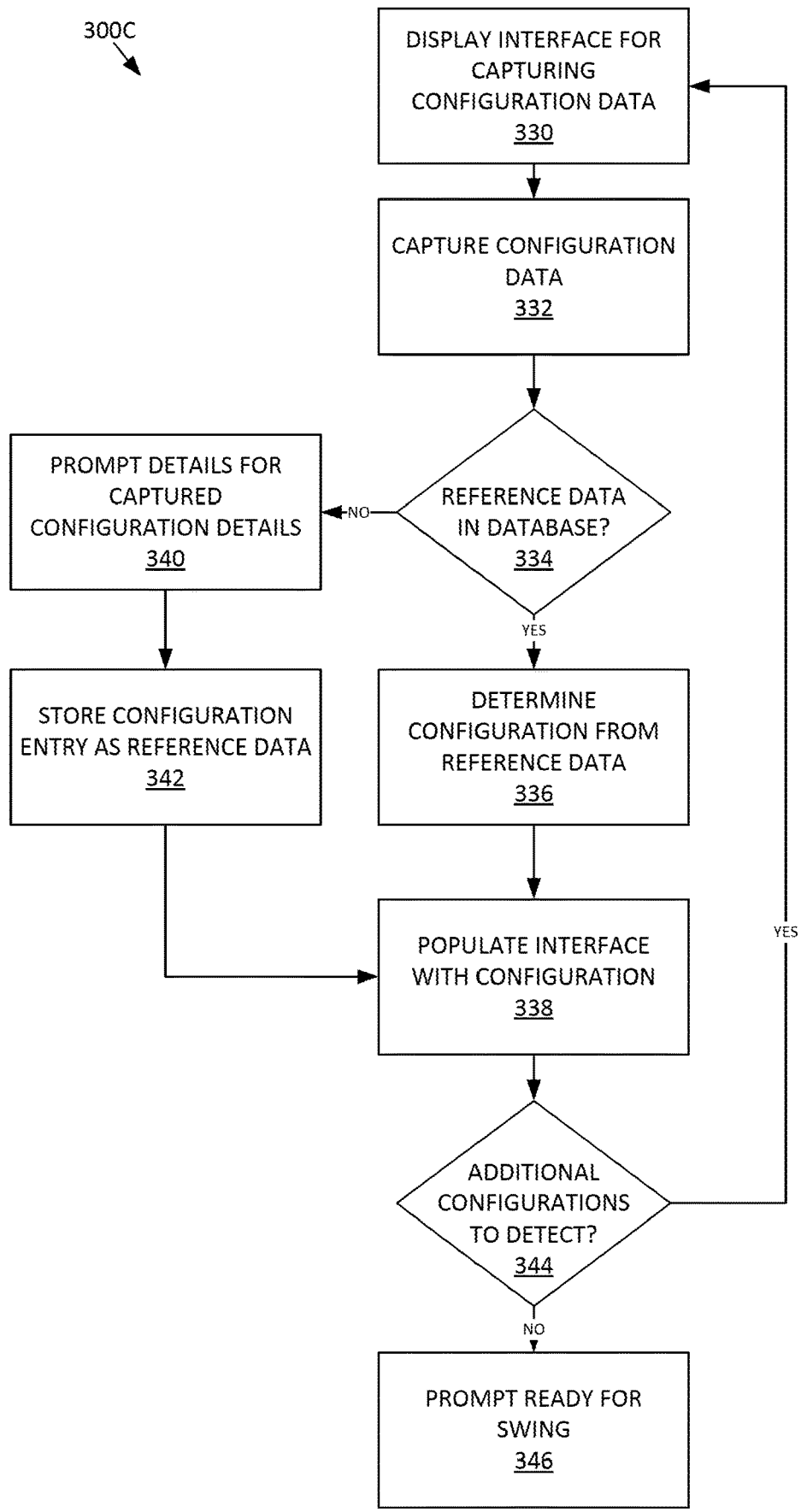
FIG. 3C depicts another example method for detecting a golf club configuration.

FIG. 3C depicts another example method 300C for detecting a golf club configuration. At operation 330, a user interface is displayed for capturing configuration data. The user interface may indicate a particular element of the golf club that is to be scanned to capture configuration data. For example, the user interface may instruct a user to capture configuration data for a club head, a shaft, or an adjustment system. The user interface may also indicate a particular type of configuration detection device that is to be used to capture the configuration data. The user interface may also provide options for a user to select the type of the configuration detection device that will be used to capture the configuration data. At operation 332, the configuration data is captured. Capturing the configuration data may be accomplished using any of the operations discussed above. At operation 334, a determination is made as to whether the captured configuration data is included in a database storing reference configuration data. The determination in operation 334 may be made in part by querying the database with the captured configuration data. If the query returns a non-null result, the database includes an entry for the captured configuration data. If the database does include the captured configuration data, the method 300C flows to operation 336 where the configuration state corresponding to captured configuration state is determined from the reference configuration data. For example, the results of the query to the database may indicate the corresponding configuration state. At operation 338, the user interface may then be populated with the determined configuration state.

If, however, it is determined in operation 334 that the database is missing an entry for the captured configuration data, the method 300C flows to operation 340 where a prompt for additional details regarding the configuration state corresponding to the captured configuration data. The details for the configuration state corresponding to the captured configuration data are received in response to the prompt. Those details may be received as manual entry into a displayed user interface. The received details for the configuration state are then correlated with the captured configuration data and stored as reference configuration data in operation 342. For instance, the captured configuration data and the received details may be stored as entries in a database such that a subsequent query for the captured configuration data returns a result of the received configuration state details. Flow then proceeds to operation 338, where the user interface is populated with the received configuration state details.

At operation 344, a determination is made as to whether there are additional configurations of the golf club that need to be detected. As an example, the reference configuration data may also include all the adjustable systems for a particular type of golf club. For instance, a golf club may have different types of club heads and shafts that may be used and each club head may include two adjustable systems, such as a configurable hosel and an adjustable weighting system. If only the shaft has been scanned or captured, a determination that a club head still needs to be scanned may be made. If the shaft and club head have been scanned, a determination that one or more adjustment systems still need to be scanned may be made. If there are still additional configurations that need to be detected or scanned, method 300C flows back to operation 330 where the method 300C repeats for the next configuration to be detected or scanned. If it is determined in operation 344 that there are no additional configurations that need to be detected, the method 300C flows to operation 346 where a prompt is displayed indicating that the system is ready for the player to swing the golf club.

Figure 3D:
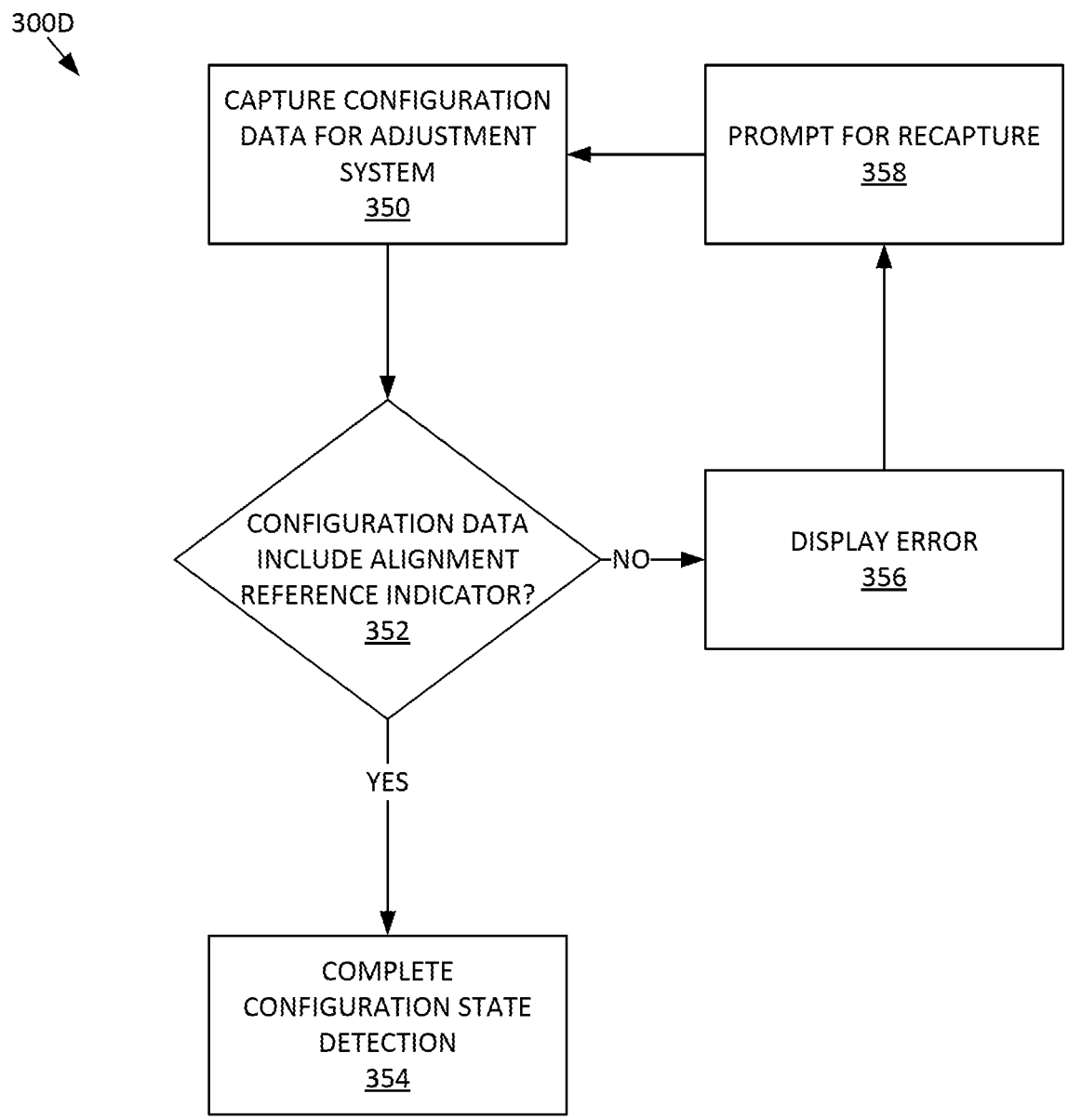
FIG. 3D depicts another example method for detecting a golf club configuration.

FIG. 3D depicts another example method 300D for detecting a golf club configuration. At operation 350 configuration data for an adjustment system is captured. Capturing configuration data may be accomplished using any of the operations discussed above. At operation 352, a validation of the configuration data is performed by determining whether an alignment reference indicator is included in the configuration data. For example, where the configuration data is an image, a determination may be made as to whether the captured image includes a marking corresponding to the alignment reference indicator. As another example, where the configuration data includes a barcode, a determination may be made as to whether the portion of the barcode corresponding to the alignment reference indicator is present in the configuration data. If the alignment reference indicator is present in the configuration data, the capture of configuration data is considered valid and the method 300D flows to operation 354 where the detection of the configuration state of the adjustable system is completed using any of the methods or operations discussed above.

If it is determined in operation 352 that the alignment reference indicator is not present in the captured configuration data, the method 300D flows to operation 356 where an error is displayed or sounded indicating that the scan was invalid or otherwise unsuccessful. A prompt to recapture configuration data for the adjustment system is then displayed at operation 358. The method 300D then flows back to operation 350 where method 300D repeats to recapture configuration data for the adjustment system.

Figure 4:
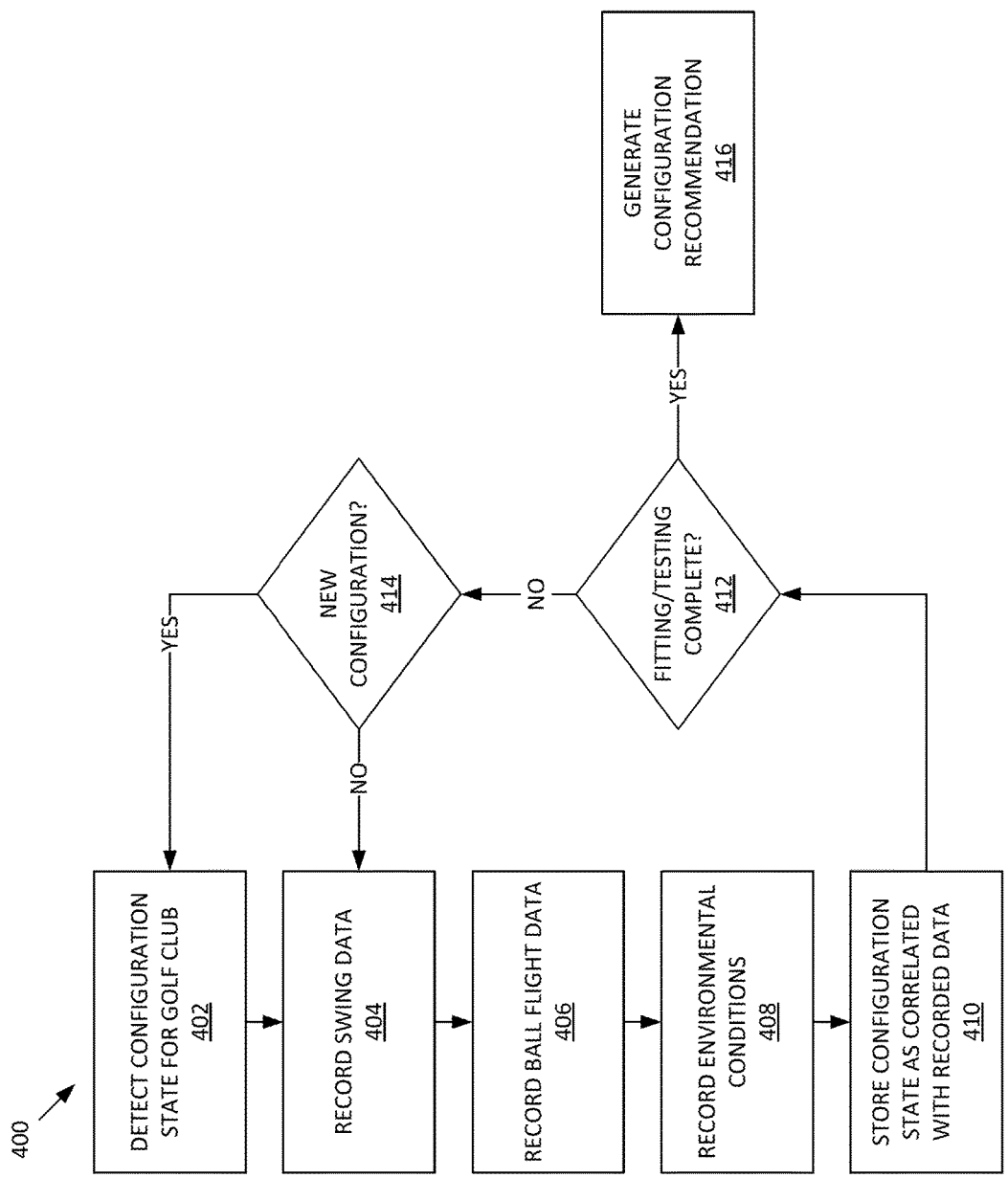
FIG. 4 depicts an example method for detecting a golf club configuration and storing swing and ball flight data.

FIG. 4 depicts an example method 400 for detecting a golf club configuration and storing swing and ball flight data. Method 400 generally allows for measuring performance data and statistics to be tracked for different configuration states of a golf club. For instance, a first golf club configuration state may be detected by a golf club configuration detection system. The system may then record performance data for multiple golf shots with the golf club in the first configuration state, and that performance data is correlated with the first configuration state and stored. When the golf club is altered to be in a new configuration state, the golf club can be rescanned and the new configuration state is detected. Performance data for golf shots with the golf club may then be recorded or tracked. That performance data is correlated with the new configuration state and stored. The process continues for all the desired configuration states that the fitting specialist or player desires to test. Once the fitting or testing is complete, a recommendation for a best or preferred configuration state may be generated based on the recorded performance data correlated with the respective tested configuration states.

More specifically, at operation 402, the configuration state for the golf club is detected using any of the methods or operations discussed above. The configuration state of the golf club may include the shaft type, club head type, and/or the configuration state for any adjustable systems. At operation 404, swing data is recorded for the golf club in the detected configuration state. The swing data may be captured by the swing tracker 122 of the golf club configuration detection system 100 in FIG. 1A. At operation 406, ball flight data is recorded for a strike of a golf ball with the golf club in the detected configuration state. The ball flight data may be recorded by the flight tracker 120 of the golf club configuration detection system 100 in FIG. 1A. At operation 408, environmental conditions, such as temperature, wind speed, humidity, air pressure, and other environmental conditions, may be recorded. At operation 410, the detected configuration state is stored as correlated with the data recorded in operations 404-408. At operation 412, a determination is made as to whether a fitting or testing session is complete. If the fitting or testing session is complete, a recommendation for a configuration state for the golfer may be generated at operation 416. The recommendation for the configuration state may be based on the data stored in operation 410. If the fitting or testing session is not complete, the method 400 flows to operation 414 where a determination may be made as to whether the golf club has been altered into a new configuration state. The determination may be based on input into the golf club configuration detection system. For instance, a fitting specialist or other user may select a switch, button, or other user interface control to indicate the configuration state of the golf club has been altered. The indication may also be triggering one or more of the configuration detection devices to scan the golf club. If the golf club has not been altered, the method 400 flows from operation 414 to operation 404. Performance characteristics and environmental data are then tracked for subsequent swings of the golf club in the detected configuration state. If the golf club configuration has been altered, the method 400 flows from operation 414 to operation 402 where the new configuration state for the golf club is detected.

Many of the embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. One should appreciate that the present technology captures physical signals, such as electromagnetic waves in the infrared, visible, and/or radio-frequency spectrum, and transforms those physical signals into digital data capable of being stored in memory and processed by one or more processors.

Although specific embodiments are described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A golf club configuration detection system comprising:
a first configuration detection device including at least one camera, wherein the first configuration detection device is configured to automatically detect configuration data for a golf club;
a golf club performance tracking device;
at least one processor operatively connected to the golf club performance tracking device and the first configuration detection device; and
a memory operatively connected to the at least one processor and storing instructions that, when executed by the at least one processor, cause the golf club configuration detection system to perform a method, the method comprising:
receiving, from the first configuration detection device, a first image of a first adjustment system of a golf club head when the first adjustment system is in a first configuration state, wherein the first adjustment system includes at least one configurable component capable of being physically adjusted;
providing the first image as input into a trained image analysis algorithm to identify a first optical code identifier of the first adjustment system, wherein the first optical code identifier corresponds to physical markings of the adjustment system;
causing a comparison of the first optical code identifier to reference configuration data in a database, wherein the reference configuration data corresponds to multiple configuration states of a golf club;
based on the comparison of the optical code identifier and the reference configuration data, determining that the first adjustment system is in the first configuration state, wherein the first configuration state corresponds to at least one of a loft, a lie, or a weight of the golf club head;
receiving golf club performance data from the golf club performance tracking device;
correlating the received golf club performance data with the first configuration state of the first adjustment system;
receiving, from the first configuration detection device, a second image of the first adjustment system when the first adjustment system is in a second configuration state;
providing the second image as input into a trained image analysis algorithm to identify a second optical code identifier of the first adjustment system;
based on the comparison of the second optical code identifier and the reference configuration data, determining that the first adjustment system is in the second configuration state;
receiving, from the first configuration detection device, a third image of the first adjustment system, wherein the first adjustment system is in a third configuration state;
analyzing the third image with the trained image analysis algorithm to determine that the third image does not include a marking corresponding to an alignment reference indicator of the first adjustment system; and
based on the determination that the third image does not include the marking corresponding to an alignment reference indicator, display a prompt to recapture an image of the adjustment system in the third configuration state.

2. The golf club configuration detection system of claim 1, wherein the golf club performance tracking device is at least one of a ball flight tracking device or a golf club head tracking device.

3. The golf club configuration detection system of claim 1, further comprising a second configuration detection device, wherein the second configuration detection device is one of a barcode scanner, or a radio-frequency identification (RFID) scanner.

4. The golf club configuration detection system of claim 3, wherein the method further comprises:
receiving, from the second configuration detection device, configuration data for a second adjustment system of the golf club head, wherein the second adjustment system is in a configuration state and the second adjustment system includes at least one configurable component capable of being physically adjusted;
causing a comparison of the received configuration data to the reference configuration data in the database;
based on the comparison of the configuration data, determining that the second adjustment system is in the configuration state; and
correlating the received golf club performance data with the configuration state of the second adjustment system of the golf club.

5. The golf club configuration detection system of claim 3, wherein the second configuration detection device is an RFID scanner.

6. The golf club configuration detection system of claim 1, wherein the first adjustment system is at least one of an adjustable weighting system, a shaft connection system, or an adjustable face angle system.

7. The golf club configuration detection system of claim 1, further comprising a trigger, configured to be activated by the golf club, operatively connected to the first configuration detection device and configured to activate the first configuration detection device.

8. The golf club configuration detection system of claim 1, wherein the first configuration detection device and the golf club performance tracking device are housed in a single portable housing.

9. The golf club configuration detection system of claim 1, wherein the golf club performance data includes at least one of ball speed, trajectory, spin, carry, roll, or total distance.

10. A method, performed by a golf club configuration detection system, for identifying a golf club configuration, the method comprising:
capturing, with a configuration detection device that includes at least one camera, a first image of an adjustment system of a golf club head, the first image including first configuration data for the adjustment system when the adjustment system is in a first configuration state, wherein the adjustment system includes at least one configurable component capable of being physically adjusted;
causing a comparison of the captured first configuration data to reference configuration data in a database, wherein the reference configuration data corresponds to multiple configuration states of the adjustment system;
based on the comparison of the first configuration data, determining that the adjustment system is in the first configuration state;
capturing, with the configuration detection device, an image of the adjustment system when the adjustment system is in a second configuration state, the image including second configuration data of the adjustment system;

causing a comparison of the captured second configuration data to the reference configuration data;

based on the comparison of the second configuration data, determining that the adjustment system is in the second configuration state;

capturing third configuration data of the adjustment system in a third configuration state;

causing a comparison of the captured third configuration data to the reference configuration data; and based on the comparison of the third configuration data, determining that the reference configuration data does not include a corresponding entry for the third configuration data;

based on determining that the reference configuration data does not include a corresponding entry for the third configuration data, displaying an interface to receive manual entry of details about the third configuration state;

receiving entry of the details about the third configuration state;

correlating the third configuration state with the captured third configuration data; and storing the captured third configuration data as reference configuration data in the database.

11. The method of claim 10, further comprising:

capturing additional data from a shaft of the golf club and from a golf club head of the golf club;

causing a comparison of the additional data to the reference configuration data in the database; and based on the comparison of the additional data to the reference configuration data, identifying the shaft and golf club head.

12. The method of claim 10, wherein the captured first configuration data includes data from a capture of one of at least one of a one-dimensional barcode or a two-dimensional barcode.

13. The method of claim 10, wherein the adjustment system is a shaft connection system that includes a golf club head operably attached to a shaft of the golf club by a shaft connection system, wherein the shaft connection system includes an alignment reference indicator and a first configurable component having a first physical segment corresponding to the first configuration of the shaft connection system and a second physical segment corresponding to the second configuration of the shaft connection system, wherein:

the first physical segment includes a first unique identifier that is at least one of an optical code identifier or a radio-frequency identification identifier, wherein a first scannable configuration identifier is formed when the first physical segment is aligned with the alignment reference indicator; and the second physical segment includes a second unique identifier that is at least one of an optical code identifier or a radio-frequency identification identifier, wherein a second scannable configuration identifier is formed when the second physical segment is aligned with the alignment reference indicator.

14. The method of claim 10, further comprising:

tracking ball flight of a golf ball struck by the golf club having the adjustment system in the first configuration; and storing ball flight data from the tracked ball flight in a database such that the ball flight data is correlated with the golf club having the adjustment system in the first configuration.

15. The method of claim 10, wherein the adjustment system is at least one of an adjustable weighting system, a shaft connection system, or an adjustable face angle system.

16. The method of claim 10, wherein the third configuration state corresponds to at least one of a loft, a lie, or a weight of the golf club head.

17. A golf club configuration detection system comprising:

at least one processor; and a memory operatively connected to the at least one processor and storing instructions that, when executed by the at least one processor, cause the at least one processor to perform a method, the method comprising:

receiving, from a configuration detection device that includes at least one camera, first configuration data for an adjustment system of a golf club when the adjustment system is in a first configuration state, wherein the adjustment system includes at least one configurable component capable of being physically adjusted;

causing a comparison of the received first configuration data to reference configuration data in a database, wherein the reference configuration data corresponds to multiple configurations of the golf club;

based on the comparison of the first configuration data, determining that the adjustment system is in the first configuration state;

receiving first golf club performance data from a golf club performance tracking device while the adjustment system is in the first configuration state;

correlating the received first golf club performance data with the first configuration state of the first adjustment system;

receiving, from the configuration detection device, second configuration data for the adjustment system when the adjustment system is in a second configuration state;

causing a comparison of the second configuration data to the reference configuration data in the database;

based on the comparison of the second configuration data and the reference configuration data, determining that the adjustment system is in the second configuration state;

receiving second golf club performance data from a golf club performance tracking device while the adjustment system is in the second configuration state;

correlating the received second golf club performance data with the second configuration state of the adjustment system;

based on the first golf club performance data and the second golf club performance data, generating a recommended configuration state, wherein the recommended configuration state is one of the first configuration state or the second configuration state;

receiving, from the configuration detection device, third configuration data for the adjustment system when the adjustment system is in a third configuration state;

causing a comparison of the third configuration data to the reference configuration data;

based on the comparison of the third configuration data and the reference configuration data, determining that the reference configuration data does not include a corresponding entry for the third configuration data;

in response to determining that the reference configuration data does not include a corresponding entry for the third configuration data, displaying an interface to receive manual entry of details about the third configuration state;

receiving entry of the details about the third configuration state;

correlating the third configuration state with the third configuration data; and storing the third configuration data as reference configuration data in the database.

18. The system of claim 17, wherein the adjustment system is at least one of an adjustable weighting system, a shaft connection system, or an adjustable face angle system.

19. The system of claim 17, wherein the golf club performance tracking device is at least one of a ball flight tracking device or a golf club head tracking device.

20. The golf club configuration detection system of claim 17, wherein the third configuration state corresponds to at least one of a loft, a lie, or a weight of the golf club head.

* * * * *